United States Patent
Miyao et al.

(10) Patent No.: US 12,055,670 B2
(45) Date of Patent: Aug. 6, 2024

(54) SCINTILLATOR PANEL AND SCINTILLATOR PANEL MANUFACTURING METHOD

(71) Applicant: Toray Industries, Inc., Tokyo (JP)

(72) Inventors: Sho Miyao, Otsu (JP); Natsumi Okura, Otsu (JP); Kazuyuki Matsumura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 88 days.

(21) Appl. No.: 17/912,571

(22) PCT Filed: Mar. 22, 2021

(86) PCT No.: PCT/JP2021/011637
§ 371 (c)(1),
(2) Date: Sep. 19, 2022

(87) PCT Pub. No.: WO2021/200327
PCT Pub. Date: Oct. 7, 2021

(65) Prior Publication Data
US 2023/0141241 A1    May 11, 2023

(30) Foreign Application Priority Data
Mar. 30, 2020   (JP) .................... 2020-059633

(51) Int. Cl.
*G01T 1/20*     (2006.01)
*G01T 1/203*    (2006.01)

(52) U.S. Cl.
CPC .......... *G01T 1/2033* (2013.01); *G01T 1/2002* (2013.01); *G01T 1/2006* (2013.01)

(58) Field of Classification Search
CPC .... G01T 1/2033; G01T 1/2002; G01T 1/2006
See application file for complete search history.

(56) References Cited

U.S. PATENT DOCUMENTS 5,430,298 A * 7/1995 Possin ................. G01T 1/20183
250/366
11,287,638 B2   3/2022 Tanino et al.
(Continued)

FOREIGN PATENT DOCUMENTS

CN    101630010 A    1/2010
CN    102147359 A    8/2011
(Continued)

OTHER PUBLICATIONS

Chinese Office Action for Chinese Application No. 202180019020.1, issued Feb. 3, 2023 with translation, 23 pages.
(Continued)

*Primary Examiner* — Hugh Maupin
(74) *Attorney, Agent, or Firm* — Buchanan, Ingersoll & Rooney PC

(57) ABSTRACT

An object of the present invention is to enable a scintillator panel of a type having a barrier rib to have sufficient mechanical strength and enhanced brightness. A scintillator panel including a substrate, a barrier rib formed on the substrate, and a scintillator layer having a phosphor and sectioned by the barrier rib, wherein the barrier rib contains one or more compounds (P) selected from the group consisting of polyimides, polyamides, polyamideimides, and polybenzoxazoles.

9 Claims, 1 Drawing Sheet

(56) References Cited

U.S. PATENT DOCUMENTS

| | | | |
|---|---|---|---|
| 11,480,694 B2 | 10/2022 | Goto et al. | |
| 2010/0148074 A1* | 6/2010 | Menge | G01T 1/1644 250/362 |
| 2015/0316659 A1 | 11/2015 | Okamura et al. | |
| 2015/0378033 A1 | 12/2015 | Suponnikov et al. | |
| 2017/0236609 A1 | 8/2017 | Tanino et al. | |
| 2018/0051136 A1 | 2/2018 | Koyama et al. | |
| 2019/0324158 A1* | 10/2019 | Shindou | A61B 6/4208 |

FOREIGN PATENT DOCUMENTS

| | | |
|---|---|---|
| CN | 102466807 A | 5/2012 |
| CN | 103224786 A | 7/2013 |
| CN | 104516009 A | 4/2015 |
| CN | 107788999 A | 3/2018 |
| CN | 111133633 A | 5/2020 |
| EP | 3 073 493 A1 | 9/2016 |
| JP | 2004061492 A | 2/2004 |
| JP | 2004340737 A | 12/2004 |
| JP | 2012002627 A | 1/2012 |
| JP | 2019060821 A | 4/2019 |
| JP | 2019168348 A | 10/2019 |
| JP | 2019190870 A | 10/2019 |
| KR | 10-2017-0125352 A | 11/2017 |
| KR | 20180001946 A | 1/2018 |
| TW | 201940899 A | 10/2019 |
| WO | 2009028275 A1 | 3/2009 |
| WO | 2014069284 A1 | 5/2014 |
| WO | 2016021540 A1 | 2/2016 |
| WO | 2019/181444 A1 | 9/2019 |

OTHER PUBLICATIONS

Bond Three: "Curing Agents for Epoxy Resin", (Dec. 20, 1990), Retrieved from the Internet: URL:https://www.threebond.co.jp/en/technical/technicalnews/pdf/tech32.pdf, pp. 1-10.

The extended European Search Report issued Feb. 23, 2024, by the European Patent Office in corresponding European Patent Application No. 21781609.9-1001. (13 pages).

Daniel et al., "Fabrication of high aspect-ratio polymer microstructures for large-area electronic portal X-ray imagers", Sens. Actuators A Phys., Nov. 10, 2007, pp. 185-193.

International Search Report and Written Opinion for International Application No. PCT/JP2021/011637, dated May 25, 2021, 7 pages.

* cited by examiner

[Fig. 1]
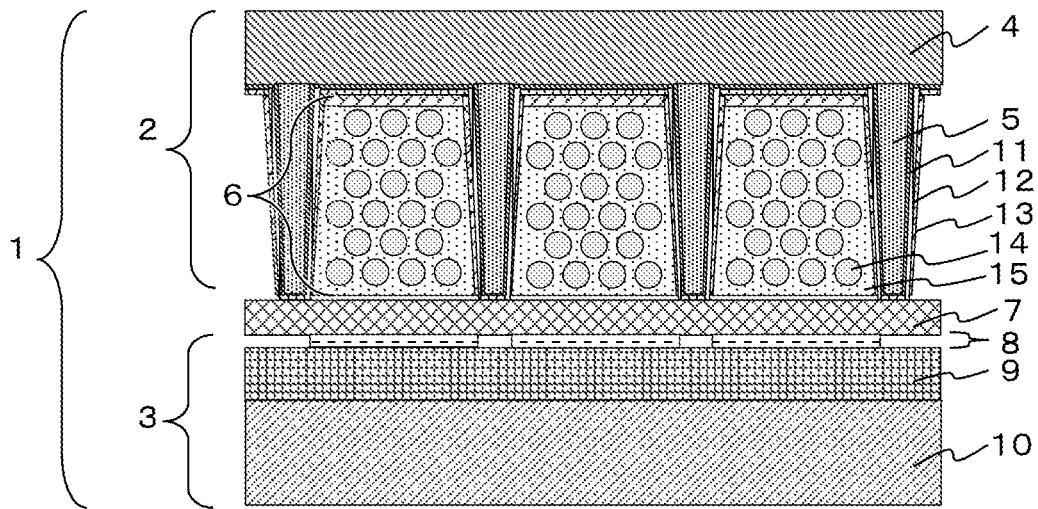
[Fig. 2]
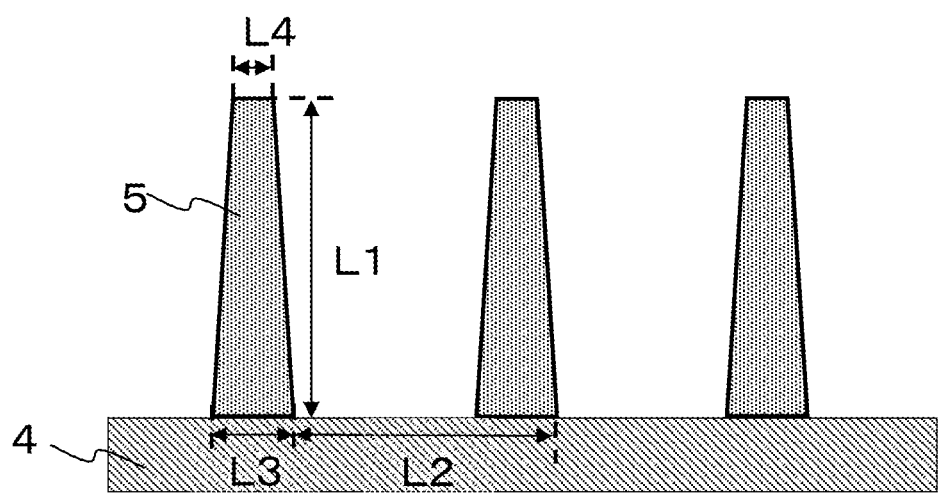
[Fig. 3]
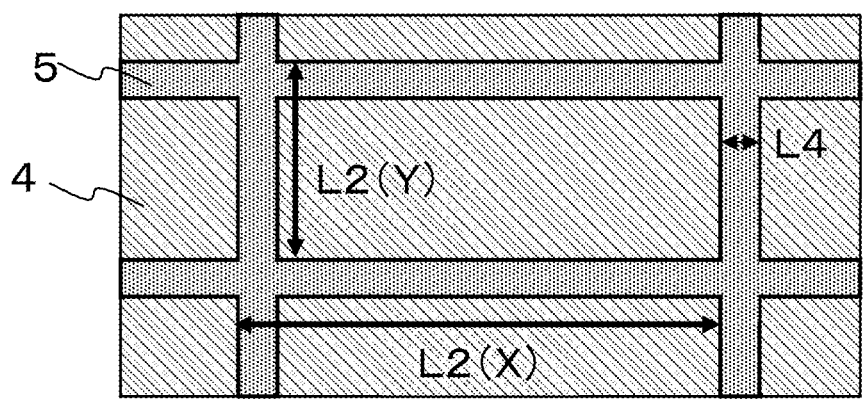

SCINTILLATOR PANEL AND SCINTILLATOR PANEL MANUFACTURING METHOD

CROSS REFERENCE TO RELATED APPLICATIONS

This is the U.S. National Phase application of PCT/JP2021/011637, filed Mar. 22, 2021 which claims priority to Japanese Patent Application No. 2020-059633, filed Mar. 30, 2020, the disclosures of each of these applications being incorporated herein by reference in their entireties for all purposes.

FIELD OF THE INVENTION

The present invention relates to a scintillator panel and a method of producing a scintillator panel.

BACKGROUND OF THE INVENTION

Radiographic images captured using films have been widely used heretofore in medical settings. However, radiographic images captured using films are analog image information. Accordingly, a digital radiation detector such as a flat panel detector (hereinafter referred to as an "FPD") has been developed in recent years. In an FPD, a scintillator panel is used to convert a radiation into visible light. A scintillator panel contains a radiation phosphor. The radiation phosphor emits visible light in response to an applied radiation. The light emitted is converted into an electric signal using a TFT (thin film transistor) or a CCD (charge-coupled device), and the radiological information is converted into digital image information. However, a scintillator panel has a problem in that light emitted from a radiation phosphor scatters in a layer (phosphor layer) containing a phosphor, thus decreasing the sharpness of an image obtained.

Accordingly, what is being proposed for the purpose of decreasing the influence of the scatter of the emitted light is a method of packing a phosphor in a space sectioned by barrier ribs. Proposed examples of materials for barrier ribs include glasses (Patent Document 1) and resins (Patent Document 2). The scatter of light emitted from a phosphor is inhibited by a barrier rib, thus making it possible to obtain an X-ray image having high sharpness.

PATENT DOCUMENTS

Patent Document 1: Japanese Patent Laid-open Publication No. 2019-168348
Patent Document 2: Japanese Patent Laid-open Publication No. 2004-340737
Patent Document 3: Japanese Patent Laid-open Publication No. 2019-190870

Non-Patent Document

Non-Patent Document 1: Daniel, J. H.; *Fabrication of high aspect-ratio polymer microstructures for large-area electronic portal X-ray imagers* [published online]; ELSEVIER; Jun. 28, 2007; p. 185-193.

SUMMARY OF THE INVENTION

In these methods, however, the amount of the phosphor is smaller by the volume of the barrier ribs than a scintillator panel having no barrier rib. In addition, the barrier rib absorbs part of the light. These things cause a problem in that the amount of light emitted by the phosphor is decreased, and the brightness of an X-ray image is decreased though the sharpness of the image is increased.

In addition, a scintillator panel described in Non-Patent Document 1, having barrier ribs produced using an epoxy resin, has a problem in that the mechanical strength is insufficient, and that the barrier rib is fractured and broken in the production processes of the scintillator panel.

In view of this, the present invention has been made, taking such conventional problems into account. An object of the present invention is to enable a scintillator panel of a barrier-rib-containing type to have sufficient mechanical strength and enhanced brightness.

That is, the present invention according to exemplary embodiments is a scintillator panel including a substrate, a barrier rib formed on the substrate, and a scintillator layer having a phosphor and sectioned by the barrier rib, wherein the barrier rib contains one or more compounds (P) selected from the group consisting of polyimides, polyamides, polyamideimides, and polybenzoxazoles.

In addition, the present invention according to exemplary embodiments is a method of producing a scintillator panel, including: a barrier rib forming step of forming a barrier rib on a substrate to define cells; a reflecting layer forming step of forming a metal reflecting layer on the surface of the barrier rib; a packing step of packing a phosphor in the cells defined by the barrier rib; wherein the barrier rib contains one or more compounds (P) selected from the group consisting of polyimides, polyamides, polyamideimides, and polybenzoxazoles and a structure derived from an epoxy compound.

The present invention makes it possible that a scintillator panel of a barrier-rib-containing type has a barrier rib having sufficient mechanical strength, and also exhibits enhanced brightness.

BRIEF DESCRIPTION OF THE DRAWINGS

FIG. 1 is a schematic cross-sectional view depicting a member for a radiation detector including a scintillator panel according to an embodiment of the present invention.

FIG. 2 is a schematic cross-sectional view depicting a scintillator panel according to an embodiment of the present invention.

FIG. 3 is a schematic top view of one example of a scintillator panel according to an embodiment of the present invention.

DETAILED DESCRIPTION EMBODIMENTS OF THE INVENTION (Scintillator Panel)

Below, embodiments of a scintillator panel according to the present invention will be described with reference to the drawings. In this regard, the drawings are schematic. In addition, the present invention is not to be limited to the embodiments described below.

FIG. 1 is a schematic cross-sectional view depicting a member 1 for a radiation detector including a scintillator panel 2 according to an embodiment of the present invention. The member 1 for a radiation detector has the scintillator panel 2 and an output substrate 3. The scintillator panel 2 has a substrate 4, a barrier rib 5, and a phosphor layer 6 in a cell defined by the barrier rib 5. The barrier rib 5 has a metal reflecting layer (hereinafter referred to as a "first reflecting layer") 11 formed on the surface thereof, and the metal reflecting layer has a protective layer 12 provided on the surface thereof. Furthermore, the protective layer 12 has a second reflecting layer 13 provided on the surface thereof. The phosphor layer 6 contains a phosphor 14 and a binder resin 15. The output substrate 3 has a substrate 10, an output layer 9 formed on the substrate 10, and a photoelectric conversion layer 8 having a photodiode and formed on the output layer 9. A barrier membrane layer 7 may be provided on the photoelectric conversion layer 8. It is preferable that the light exit face of the scintillator panel 2 and the photoelectric conversion layer 8 of the output substrate 3 are bonded or adhere to each other with the barrier membrane layer 7 interposed therebetween. The light emitted from the phosphor layer 6 reaches the photoelectric conversion layer 8 to be photoelectrically converted and outputted. Below, each of the parts will be described.

(Substrate)

The material constituting the substrate 4 is preferably a radiolucent material. The material constituting the substrate 4 is, for example, any kind of glass, polymer material, metal, or the like. Examples of glasses include quartz, borosilicate glass, chemically tempered glasses, and the like. Examples of polymer materials include: cellulose acetate; polyesters such as polyethylene terephthalate and polyethylene naphthalate; polyamides; polyimides; triacetate; polycarbonates; carbon fiber reinforced resins; and the like. Examples of metals include aluminum, iron, copper, and the like. Two or more of these may be used in combination. The material constituting the substrate 4 is preferably glass or a polymer material among these from the viewpoints of radiolucency and surface smoothness, and is more preferably a polymer material. Among the polymer materials, polyesters such as polyethylene terephthalate and polyethylene naphthalate, polyamides, and polyimides are preferable.

From the viewpoint of making the scintillator panel 2 more lightweight, the substrate 4 preferably has a thickness of 2.0 mm or less, more preferably 1.0 mm or less, in cases where the substrate is a glass substrate. Alternatively, the substrate 4 preferably has a thickness of 3.0 mm or less in cases where the substrate is composed of a polymer material.

(Barrier Rib)

The barrier rib 5 is provided at least to form defined spaces (cells). Accordingly, with the scintillator panel 2, making it possible that the size and pitch of a pixel of a photoelectric conversion element arranged in grid-like form are identical with the size and pitch of a cell of the scintillator panel 2 makes it possible that each pixel of the photoelectric conversion element corresponds to each cell of the scintillator panel 2. This makes it possible that the scintillator panel 2 is used to obtain an image having high sharpness.

The barrier rib 5 contains one or more compounds (P) (hereinafter referred to simply as the "compound (P)") selected from the group consisting of polyimides, polyamides, polyamideimides, and polybenzoxazoles. A scintillator panel according to an embodiment of the present invention includes the barrier rib containing the compound (P), thereby making it possible to enhance the brightness. The principle of this is considered to consist mainly in the below-mentioned two points. However, the below-mentioned inferable principle is not limitative. In addition, both of the below-mentioned two points do not always have to be satisfied together.

The barrier rib containing the compound (P) can be formed in the shape of a pattern that is fine and has a high aspect ratio, compared with the barrier rib composed of glass or the like. Accordingly, increasing the amount of the phosphor packed in the scintillator layer makes it possible to enhance the brightness.

In addition, the barrier rib having the compound (P) has excellent surface smoothness. This is presumably because the compound (P) has excellent heat resistance, mechanical characteristics, and chemical resistance, and thus, is less susceptible to chemical and mechanical damage from the outside in the below-mentioned step of producing the barrier rib and other production steps for the scintillator panel, so that the deformation, fracture, or breakage of the barrier rib is less likely to follow. In addition, the barrier rib having excellent surface smoothness makes it possible to increase the reflectance of light at the surface of the barrier rib. Additionally, in cases where a reflecting layer is formed on the surface of such a barrier rib, the barrier rib makes it possible to form a reflecting layer having high smoothness. This makes it possible to enhance the takeout efficiency of light emitted from the phosphor, and enhance the brightness.

The compound (P) is preferably a polyimide from the viewpoints of heat resistance, chemical resistance, and mechanical strength.

The surface smoothness of the barrier rib can be evaluated using an existing surface roughness measurement method. Examples of surface roughness measurement methods include methods of a stylus type, light interference type, or laser microscope type. To evaluate the surface roughness of a structure intricate as the side of the barrier rib, a method based on using a laser microscope is preferably used. An evaluation index to be used preferably for surface roughness is an arithmetic average slope angle determined by arithmetically averaging a slope (slope angle) made by each minute portion of a curve given by measuring the surface shape. The smaller the value of the arithmetic average slope angle, the smoother the surface shape.

In cases where a photosensitive resin composition is produced using the compound (P), the photosensitive material is limited to no particular component. Examples of the composition include: photo-radical polymerizable negative-type photosensitive resin compositions given by adding a polyfunctional acryl monomer and a photo-radical polymerization initiator to the compound (P); photo-cationic polymerization negative-type photosensitive resin compositions given by adding an epoxy compound and a photo-cationic polymerization initiator to the compound (P); photosoluble positive-type photosensitive resin compositions given by adding a naphthoquinone photosensitizer to the compound (P); and the like. In particular, among these, a photo-cationic polymerizable negative-type photosensitive resin composition containing an epoxy compound can form a barrier rib having a high aspect ratio, and hence, is preferable.

The compound (P) is preferably a compound having at least one repeating unit structure selected from the structures represented by the following general formulae (1) to (2).

[Chem. 1]

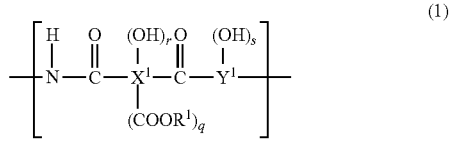

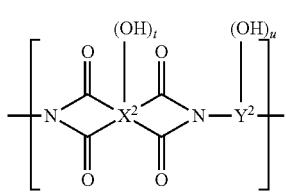

In the general formulae (1) to (2), $X^1$ represents a di- to octa-valent organic group, $X^2$ represents a tetra- to octa-valent organic group, $Y^1$ and $Y^2$ independently represent a di- to hexa-valent organic group, and $R^1$ represents a hydrogen atom or a $C_1$-$C_{20}$ hydrocarbon group. q is an integer of 0 to 2, and r, s, t, and u are independently an integer of 0 to 4.

$Y^1$ and $Y^2$ represent an organic group derived from a diamine. $Y^1$ and $Y^2$ preferably contain a hydrocarbon group, more preferably contains an aromatic hydrocarbon group or an alicyclic hydrocarbon group. Containing an aromatic hydrocarbon group or an alicyclic hydrocarbon group makes it possible to further enhance the heat resistance of the resin, thus making it possible to maintain the shape and smoothness of the barrier rib in the below-mentioned step of producing a scintillator panel. The carbon number of a hydrocarbon group contained in $Y^1$ and $Y^2$ is preferably 5 to 40.

$Y^1$ and $Y^2$ are preferably a diamine residue having a structure derived from a phenolic hydroxyl group. A photosensitive resin composition that contains a diamine residue having a structure derived from a phenolic hydroxyl group, that is, contains the compound (P) contains a diamine residue having a phenolic hydroxyl group, and thus enables the resin to have suitable solubility in an alkaline developer, hence making it possible to obtain high contrast between the exposed portion and the unexposed portion, and form a desired pattern. A structure derived from a phenolic hydroxyl group specifically means an ether bond or a urethane bond that contain an aromatic ring, and is formed by allowing a phenolic hydroxyl group to react with a cyclic ether compound such as epoxy or oxetane, an isocyanate compound, or the like.

Specific examples of diamines having a phenolic hydroxyl group include, but are not limited to; aromatic diamines such as bis(3-amino-4-hydroxyphenyl)hexafluoropropane, bis(3-amino-4-hydroxyphenyl)sulfone, bis(3-amino-4-hydroxyphenyl)propane, bis(3-amino-4-hydroxyphenyl)methylene, bis(3-amino-4-hydroxyphenyl)ether, bis(3-amino-4-hydroxy)biphenyl, 2,2'-ditrifluoromethyl-5,5'-dihydroxyl-4,4'-diaminobiphenyl, bis(3-amino-4-hydroxyphenyl)fluorene, and 2,2'-bis(trifluoromethyl)-5,5'-dihydroxybenzidine; the same compounds as these except that part of the hydrogen atoms of the aromatic ring or the hydrocarbon is/are substituted with a $C_1$-$C_{10}$ alkyl group, fluoroalkyl group, halogen atom, or the like; diamines having a structure represented as below-mentioned; and the like. In addition, these diamine components may be contained in combination of two or more kinds thereof.

[Chem. 2]

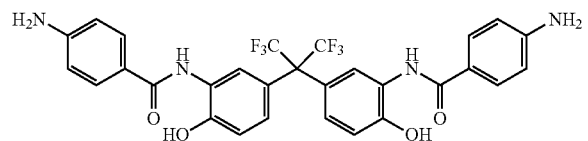

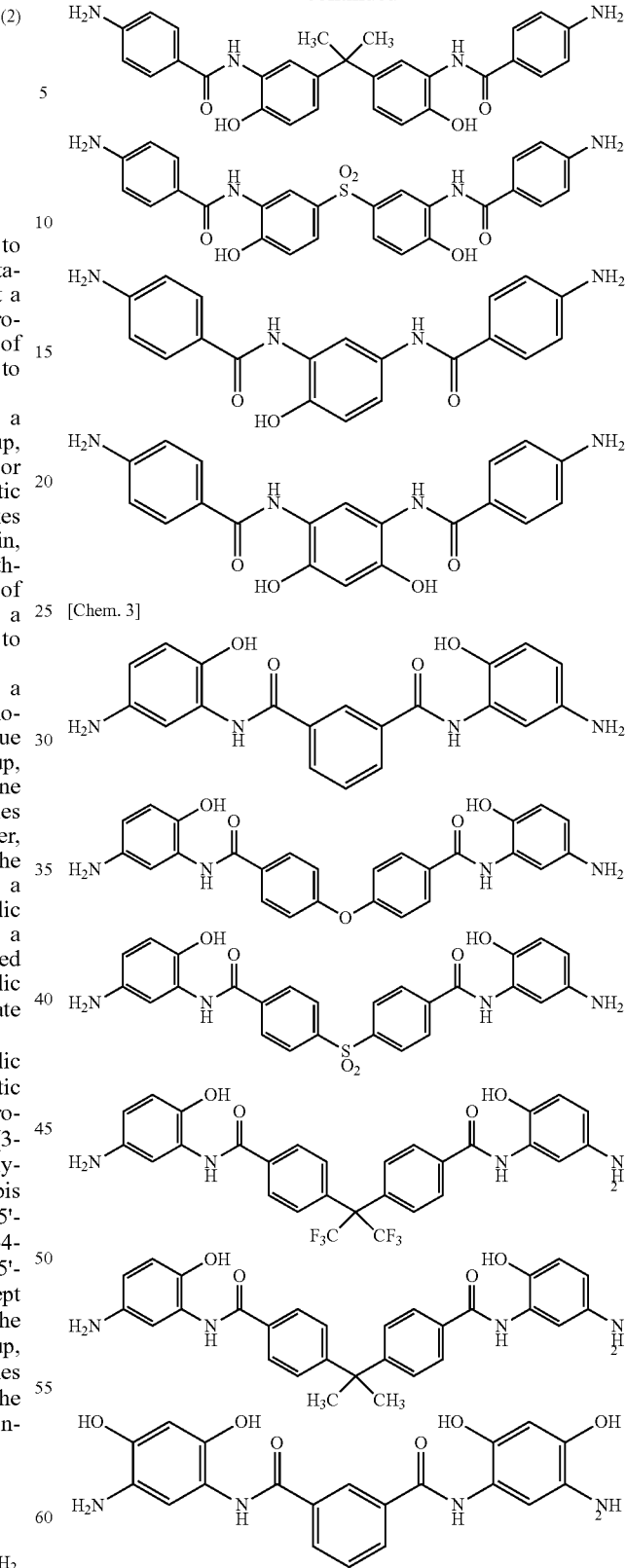

[Chem. 3]

The compound (P) may contain an aromatic diamine residue other than these. Specific examples of aromatic diamines include, but are not limited to: aromatic diamines such as 3,4'-diaminodiphenyl ether, 4,4'-diaminodiphenyl ether, 3,4'-diaminodiphenylmethane, 4,4'-diaminodiphenylmethane, 3,4'-diaminodiphenylsulfone, 4,4'-diaminodiphenylsulfone, 3,4'-diaminodiphenyl sulfide, 4,4'-diaminodiphenyl sulfide, 1,4-bis(4-aminophenoxy)benzene, benzine, m-phenylene diamine, p-phenylene diamine, 1,5-naphthalene diamine, 2,6-naphthalene diamine, bis(4-aminophenoxyphenyl)sulfone, bis(3-aminophenoxyphenyl)sulfone, bis(4-aminophenoxy)biphenyl, bis{4-(4-aminophenoxy)phenyl} ether, 1,4-bis(4-aminophenoxy)benzene, 2,2'-dimethyl-4,4'-diaminobiphenyl, 2,2'-diethyl-4,4'-diaminobiphenyl, 3,3'-dimethyl-4,4'-diaminobiphenyl, 3,3'-diethyl-4,4'-diaminobiphenyl, 2,2',3,3'-tetramethyl-4,4'-diaminobiphenyl, 3,3',4,4'-tetramethyl-4,4'-diaminobiphenyl; and 2,2'-bis(trifluoromethyl)-4,4'-diaminobiphenyl; the same compounds as these except that part of the hydrogen atoms of the aromatic ring or the hydrocarbon is/are substituted with a $C_1$-$C_{10}$ alkyl group, fluoroalkyl group, halogen atom, or the like; and the like. In addition, these diamine components may be contained or used in combination of two or more kinds thereof.

$X^1$ and $X^2$ represent a carboxylic residue. $X^1$ and $X^2$ preferably contain a hydrocarbon group, more preferably contains an aromatic hydrocarbon group or an alicyclic hydrocarbon group. Containing an aromatic hydrocarbon group or an alicyclic hydrocarbon group makes it possible to further enhance the heat resistance of the resin, thus making it possible to maintain the shape and smoothness of the barrier rib in the below-mentioned step of producing a scintillator panel.

Furthermore, it is more preferable to contain an alicyclic hydrocarbon group in that the color of the resin is transparent with respect to a wavelength to be used during the below-mentioned formation of a barrier rib, and that the barrier rib can be processed in the form of a thick and fine pattern.

The carbon number of a hydrocarbon group contained in $X^1$ and $X^2$ is preferably 5 to 40. Examples of more preferable carboxylic acids containing a hydrocarbon group include carboxylic acids that contain carbon and hydrogen as essential atoms, and may have one or more atoms selected from the group consisting of nitrogen, oxygen, and halogen.

Specific examples of carboxylic acids containing a hydrocarbon group include, but are not limited to: terephthalic acid; isophthalic acid; diphenyl ether dicarboxylate; bis(carboxy phenyl)hexafluoropropane; biphenyl dicarboxylate; benzophenone dicarboxylate; triphenyl dicarboxylate; 5-[2,2,2-trifluoro-1-hydroxy-1-(trifluoromethyl)ethyl]-1,3-benzene dicarboxylate; trimellitic acid; trimesic acid; diphenyl ether tricarboxylic acid; biphenyltricarboxylic acid; pyromellitic acid; 3,3',4,4'-biphenyltetracarboxylic acid; 2,3,3',4'-biphenyltetracarboxylic acid; 2,2',3,3'-biphenyltetracarboxylic acid; 3,3',4,4'-benzophenonetetracarboxylic acid; 2,2',3,3'-benzophenonetetracarboxylic acid; 1,1-bis(3,4-dicarboxyphenyl)ethane; 1,1-bis(2,3-dicarboxyphenyl)ethane; bis(3,4-dicarboxyphenyl)methane; bis(2,3-dicarboxyphenyl)methane; bis(3,4-dicarboxyphenyl)ether; 1,2,5,6-naphthalenetetracarboxylic acid; 2,3,6,7-naphthalenetetracarboxylic acid; 2,3,5,6-pyridinetetracarboxylic acid; 3,4,9,10-perylenetetracarboxylic acid; 4,4'-(hexafluoroisopropylidene)diphthalic acid; 1,2,3,6-tetrahydrophthalic anhydride; ethylene glycol bisanhydrotrimellitate; 1,2,3,4-butanetetracarboxylic dianhydride; 1,3,3a,4,5,9b-hexahydro-5(tetrahydro-2,5-dioxo-3-furanyl)naphtho[1,2-C]furan-1,3-dione; and 5-norbornene-2,3-dicarboxylic anhydride; aromatic tetracarboxylic acids having the below-mentioned structure; aliphatic tetracarboxylic acids such as butanetetracarboxylic acid and 1,2,3,4-cyclopentanetetracarboxylic acid; and the like.

In addition, these carboxylic acid components may be contained or used in combination of two or more kinds thereof.

[Chem. 4]

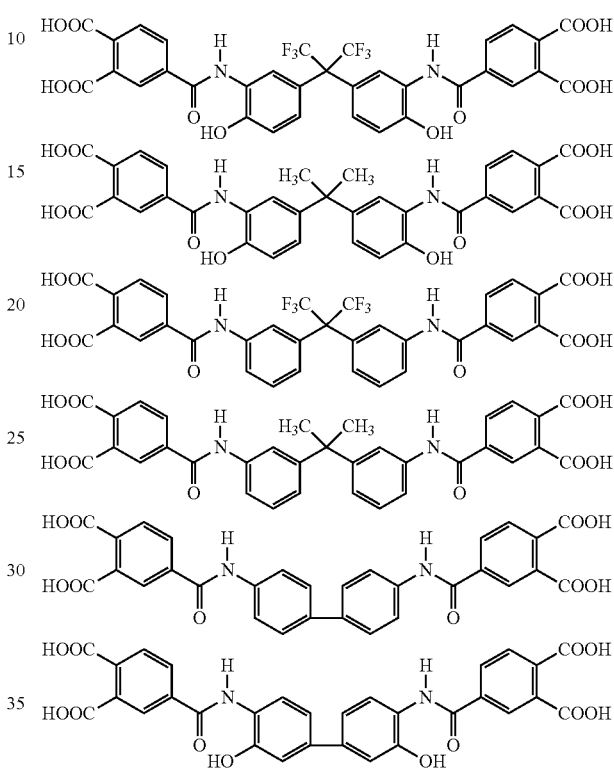

In the general formula (1) above, $R^1$ represents a hydrogen atom or a $C_1$-$C_{20}$ hydrocarbon group. Examples of hydrocarbon groups include aliphatic hydrocarbon groups and aromatic hydrocarbon groups. Such an aliphatic hydrocarbon group may be linear or branched, and may be partially or wholly cyclic. In the aromatic hydrocarbon group, at least one of the hydrogen atoms may be substituted with an aliphatic hydrocarbon.

The molar ratio of a structure represented by the general formulae (1) and (2) can be verified by a method of calculating the molar ratio of a monomer used for polymerization, or a method of using a nuclear magnetic resonance device (NMR) to detect a peak from a polyamide structure, imide precursor structure, imide structure, or oxazole structure in the resulting resin, resin composition, or cured film.

An end of the molecular chain of the compound (P) is preferably a carboxylic residue. Having a structure in which an end of the molecular chain of the compound (P) is derived from a carboxylic residue facilitates the progress of cationic polymerization and the formation of a barrier rib having a desired shape, compared with having a structure in which an end of the molecular chain is derived from a diamine residue, even in cases where the resulting product is a photo-cationic polymerizable resin composition containing the compound (P). As a result, it is possible to increase the packing amount of the phosphor and to enhance the brightness. Such a compound (P) can be obtained by making the amount of an acid anhydride larger than that of a diamine used for polymerization. Another method of obtaining the compound (P) containing a carboxylic residue as an end of the molecular chain is a method in which the compound can be obtained by using a specific compound, specifically, an acid anhydride, monocarboxylic acid, monoacid chloride compound, monoactive ester compound from among compounds to be used commonly as end-capping agents.

In addition, capping an end of the molecular chain of the compound (P) with an end-capping agent of a carboxylic acid or an acid anhydride having a hydroxyl group, carboxyl group, sulfonic group, thiol group, vinyl group, ethynyl group, or allyl group makes it possible to easily adjust the dissolution rate of the compound (P) to an aqueous alkali solution and the mechanical characteristics of the resulting cured film within a preferable range. In addition, it is possible to allow a plurality of end-capping agents to react, thus introducing a plurality of different end groups.

Preferable examples of acid anhydrides, monocarboxylic acids, monoacid chloride compounds, and monoactive ester compounds as end-capping agents include: acid anhydrides such as phthalic anhydride, maleic anhydride, nadic anhydride, cyclohexanedicarboxylic anhydride, and 3-hydroxyphthalic anhydride; monocarboxylic acids such as 3-carboxyphenol, 4-carboxyphenol, 3-carboxythiophenol, 4-carboxythiophenol, 1-hydroxy-7-carboxynaphthalene, 1-hydroxy-6-carboxynaphthalene, 1-hydroxy-5-carboxynaphthalene, 1-mercapto-7-carboxynaphthalene, 1-mercapto-6-carboxynaphthalene, 1-mercapto-5-carboxynaphthalene, 3-carboxybenzenesulfonic acid, and 4-carboxybenzenesulfonic acid, and monoacid chloride compounds obtained by forming a carboxyl group of such a monocarboxylic acid into an acid chloride; monoacid chloride compounds obtained by forming, into an acid chloride, only one of the carboxyl groups of a dicarboxylic acid such as terephthalic acid, phthalic acid, maleic acid, cyclohexanedicarboxylic acid, 1,5-dicarboxynaphthalene, 1,6-dicarboxynaphthalene, 1,7-dicarboxynaphthalene, or 2,6-dicarboxynaphthalene; active ester compounds obtained by allowing a monoacid chloride compound to react with N-hydroxybenzotriazole, imidazole, or N-hydroxy-5-norbornene-2,3-dicarboxyimide; and the like. These may be used in combination of two or more kinds thereof.

The compound (P) having such an end-capping agent introduced therein becomes a compound containing a carboxylic residue as an end of the molecular chain. An end-capping agent that can be used to obtain the compound (P) containing a carboxylic residue as an end of the molecular chain can be detected easily by the below-mentioned method. For example, an end-capping agent used in the present invention can be detected easily as follows: a compound (P) having an end-capping agent introduced therein is dissolved in an acidic solution, and decomposed into an amine component and an acid anhydride component that are the constituent units, and the components are detected by gas chromatography (GC) or NMR. Besides this, using a pyrolysis gas chromatograph (PGC), infrared spectrum, and $^{13}$C-NMR spectrum to directly measure a resin component having an end-capping agent introduced therein enables easy detection.

The compound (P), for example, a polyimide or a polybenzoxazole is synthesized by the following method, but the synthesis method is not limited thereto. A polyimide structure is synthesized by a known method in which part of a diamine is replaced with a primary monoamine as an end-capping agent, or in which a tetracarboxylic dianhydride is replaced with a dicarboxylic anhydride as an end-capping agent. For example, a polyimide precursor is obtained by utilizing a method such as: a method in which a tetracarboxylic dianhydride, diamine compound, and monoamine are allowed to react at low temperature; a method in which a tetracarboxylic dianhydride, dicarboxylic anhydride, and diamine compound are allowed to react at low temperature; or a method in which a diester is obtained from a tetracarboxylic dianhydride and an alcohol, and allowed to react in the presence of a diamine, monoamine, and condensing agent. Then, a polyimide can be synthesized by utilizing a known imidization reaction method.

A polybenzoxazole structure is synthesized by a condensation reaction between a bisaminophenol compound and a dicarboxylic acid. For example, a polybenzoxazole precursor is obtained by utilizing the following method: a method in which a dehydrating condensing agent such as dicyclohexylcarbodiimide (DCC) and an acid are allowed to react, and to the resulting product, a bisaminophenol compound is added; a method in which a dicarboxylic dichloride solution is added dropwise to a solution of a bisaminophenol compound supplemented with a tertiary amine such as pyridine; or the like. Then, a polybenzoxazole can be synthesized by utilizing a known condensation reaction method. It is preferable that, after being polymerized by the above-mentioned method, the compound (P) is added to a large amount of water, a liquid mixture of methanol and water, or the like, precipitated, filtrated, and dried to be isolated. The drying temperature is preferably 40 to 100° C., more preferably 50 to 80° C. This operation makes it possible to remove an unreacted monomer and an oligomer component such as a dimer or a trimer, and to enhance the film characteristics obtained after heat-curing.

The imidization ratio of a polyimide or a polyamideimide can be determined easily, for example, by the below-mentioned method. First, an infrared absorption spectrum of a polymer is measured to verify the occurrence of absorption peaks (near 1780 cm$^{-1}$ and 1377 cm$^{-1}$) of an imide structure that are attributable to a polyimide and a polyamideimide. Next, the polymer is heat-treated at 350° C. for 1 hour, and the resulting polymer is used as a sample having an imidization ratio of 100% to measure an infrared absorption spectrum. On the basis of the comparison between the resins before and after the heat-treatment in terms of the peak intensity near 1377 cm$^{-1}$, the amount of the imide group in the resin before the heat-treatment is calculated to determine the imidization ratio. The imidization ratio is preferably 50% or more, still more preferably 80% or more, because of inhibiting a change in the ring closure ratio during heat-curing, and obtaining the effect of lowering the stress.

(Epoxy Compound)

It is preferable that the barrier rib 5 further contains a structure derived from an epoxy compound, that is, that the photosensitive resin composition contains a compound (P) containing an epoxy compound. An epoxy compound makes it possible to further enhance the processability without impairing the heat resistance and mechanical strength of the compound (P), and thus, makes it easier to form the below-mentioned barrier rib having a desired shape. This makes it possible to increase the packing amount of the phosphor and to enhance the brightness. A structure derived from an epoxy compound specifically means an acyclic ether bond or a hydroxyl group generated by the ring-opening of an epoxy, and is formed by the polymerization of an epoxy compound, the addition reaction or the like of a phenolic hydroxyl group, or the like.

The amount of an epoxy compound contained in the photosensitive resin composition preferably does not exceed 2.0 times the amount of the compound (P) in terms of the mass fraction in order not to impair the characteristics of the compound (P). In cases where the photosensitive resin composition contains a component other than the compound (P) and an epoxy compound, the total amount of the component is preferably not more than the total amount of the compound (P) and an epoxy compound in terms of the mass fraction.

An epoxy compound that can be used is any known epoxy compound or the like. Examples thereof include aromatic epoxy compounds, alicyclic epoxy compounds, and aliphatic epoxy compounds.

Examples of aromatic epoxy compounds include: a glycidyl ether of a monovalent or multivalent phenol (a phenol, bisphenol A, phenol novolac, or alkylene oxide adduct compound thereof) having at least one aromatic ring; and the like.

Examples of alicyclic epoxy compounds include a compound (3,4-epoxycyclohexylmethyl-3,4-epoxycyclohexane carboxylate or the like) obtained by epoxidizing, with an oxidizing agent, a compound having at least one cyclohexene or cyclopentene ring.

Examples of aliphatic epoxy compounds include: a polyglycidyl ether of an aliphatic multivalent alcohol or an alkylene oxide adduct thereof (1,4-butanedioldiglycidyl ether, 1,6-hexanedioldiglycidyl ether, or the like); a polyglycidyl ester of an aliphatic polybasic acid (diglycidyl tetrahydrophthalate or the like); an epoxidized product of a long-chain unsaturated compound (an epoxidized soybean oil, an epoxidized polybutadiene, or the like).

Epoxy compounds containing a nitrogen atom are preferable from the viewpoints of enhancing the compatibility with a polyimide, obtaining fine pattern processability, and in addition, not decreasing the good heat resistance and mechanical characteristics of a polyimide. Furthermore, an epoxy compound containing an isocyanurate backbone is preferable from the viewpoint of enhancing the storage stability of the resulting resin composition.

Examples of epoxy compounds containing an isocyanurate backbone include: TEPIC-S, TEPIC-L, TEPIC-VL, TEPIC-PASB22, and TEPIC-FL (tradenames, all manufactured by Nissan Chemical Corporation) that are triglycidyl isocyanurates; and the like.

Aliphatic epoxy compounds are preferable from the viewpoint of not decreasing the transparency of the resin composition and the good mechanical characteristics of a polyimide. Examples of aliphatic epoxy compounds include: SHOFREE BATG and SHOFREE PETG (tradenames, all manufactured by Showa Denko K.K.); DENACOL EX-321L and DENACOL EX-521 (tradenames, all manufactured by Nagase ChemteX Corporation); and the like.

Alicyclic epoxy compounds are preferable from the viewpoint of reactivity at low temperature. Examples of alicyclic epoxy compounds include: CELLOXIDE 2000, CELLOXIDE 2021P, CELLOXIDE 2081, CELLOXIDE 8081, and EPOLEAD GT401 (tradenames, all manufactured by Daicel Corporation); and the like.

These epoxy compounds may be used singly or in combination of two or more kinds thereof.

The epoxy compound is preferably cured by cationic polymerization. Curing the epoxy by cationic polymerization makes it less likely to cause insufficient curing due to oxygen inhibition during processing, and makes it easier to form the below-mentioned barrier rib having a desired shape.

The amount of an epoxy compound contained in the photosensitive resin composition is preferably 30 parts by mass or more, more preferably 50 parts by mass or more, with respect to 100 parts by mass of the compound (P), from the viewpoints of exhibiting sufficient cationic curability, and enhancing the pattern processability. On the other hand, the amount is preferably 200 parts by mass or less, more preferably 100 parts by mass or less, from the viewpoint of not decreasing the characteristics of the compound (P).

In addition, the amount of a structure derived from an epoxy compound preferably corresponds to 3 mol or more and 25 mol or less when the amount of the compound (P) in the barrier rib is 1 mol. A method that can be used to calculate the amount of an epoxy compound with respect to the compound (P) in the barrier rib is any known such method. For example, a nuclear magnetic resonance device (NMR) can be used for verification in a method of calculation from an integral value of a peak of a structure derived from the compound (P) and a peak of a structure derived from an epoxy compound in the barrier rib.

(Another Component)

A photo-cationic polymerization initiator contained in the photo-cationic polymerizable negative-type photosensitive resin composition generates acid directly or indirectly by virtue of light to cause cationic polymerization. Any known such compound can be used without any particular limitation. Specific examples include aromatic iodonium complex salts, aromatic sulfonium complex salts, and the like. Specific examples of aromatic iodonium complex salts include diphenyliodoniumtetrakis(pentafluorophenyl)borate, diphenyliodoniumhexafluorophosphate, diphenyliodoniumhexafluoroantimonate, di(4-nonylphenyl)iodoniumhexafluorophosphate, and the like. These photo-cationic polymerization initiators may be used singly or in combination of two or more kinds thereof.

The amount of the photo-cationic polymerization initiator is preferably 0.3 parts by mass or more, more preferably 0.5 parts by mass or more, with respect to 100 parts by mass of the epoxy compound. This enables the epoxy compound to exhibit sufficient curability, and makes it possible to enhance the pattern processability. On the other hand, the amount is preferably 18 parts by weight or less, more preferably 15 parts by weight or less, from the viewpoint of enhancing the storage stability of the photosensitive resin composition.

For a photo-cationic polymerizable negative-type photosensitive resin composition, a sensitizer may be used to absorb ultraviolet rays and provide a photo-acid generator with the light energy absorbed. Examples of preferable sensitizers include anthracene compounds having an alkoxy group at the 9-position and the 10-position (9,10-dialkoxy-anthracene derivative). Examples of alkoxy groups include $C_1$-$C_4$ alkoxy groups such as a methoxy group, ethoxy group, and propoxy group. The 9,10-dialkoxy-anthracene derivative may further have a substituent. Examples of substituents include: halogen atoms such as a fluorine atom, chlorine atom, bromine atom, and iodine atom; $C_1$-$C_4$ alkyl groups such as a methyl group, ethyl group, and propyl group; a sulfonic acid alkyl ester group; a carboxylic acid alkyl ester group; and the like. Examples of alkyls in sulfonic acid alkyl ester groups and carboxylic acid alkyl esters include $C_1$-$C_4$ alkyls such as methyl, ethyl, and propyl. The substitution position of such a substituent is preferably the 2-position.

The photo-cationic polymerizable negative-type photosensitive resin composition may contain a thermal cross-linking agent, preferably a compound having an alkoxy methyl group or a methylol group.

Examples of compounds having an alkoxy methyl group or a methylol group include: DML-PC, DML-PEP, DML-OC, DML-OEP, DML-34X, DML-PTBP, DML-PCHP, DML-OCHP, DML-PFP, DML-PSBP, DML-POP, DML-MBOC, DML-MBPC, DML-MTrisPC, DML-BisOC-Z, DML-BisOCHP-Z, DML-BPC, DML-BisOC-P, DMOM-PC, DMOM-PTBP, DMOM-MBPC, TriML-P, TriML-35XL, TML-HQ, TML-BP, TML-pp-BPF, TML-BPE, TML-BPA, TML-BPAF, TML-BPAP, TMOM-BP, TMOM-BPE, TMOM-BPA, TMOM-BPAF, TMOM-BPAP, HML-TPPHBA, HML-TPHAP, HMOM-TPPHBA, and HMOM-TPHAP (tradenames, all manufactured by Honshu Chemical Industry Co., Ltd.); and NIKALAC (registered trademark) MX-290, NIKALAC MX-280, NIKALAC MW-100LM, and NIKALAC MX-750LM (tradenames, all manufactured by Sanwa Chemical Co., Ltd.).

The photo-cationic polymerizable negative-type photosensitive resin composition can further contain a silane compound. Containing a silane compound makes it possible to enhance the adhesiveness of the heat-resistant resin coating. Specific examples of silane compounds include N-phenylaminoethyltrimethoxy silane, N-phenylaminoethyltriethoxy silane, N-phenylaminopropyltrimethoxy silane, N-phenylaminopropyltriethoxy silane, N-phenylaminobutyltrimethoxy silane, N-phenylaminobutyltriethoxy silane, vinyltrimethoxy silane, vinyltriethoxy silane, vinyltrichlor silane, vinyltris($\beta$-methoxyethoxy)silane, 3-methacryloxypropyltrimethoxy silane, 3-acryloxypropyltrimethoxy silane, p-styryltrimethoxy silane, 3-methacryloxypropylmethyldimethoxy silane, 3-methacryloxypropylmethyldiethoxy silane, and the like.

As required, for the purpose of enhancing the wettability with a base material, the photo-cationic polymerizable negative-type photosensitive resin composition may contain the following: a surfactant; an ester such as ethyl lactate or propylene glycol monomethyl ether acetate; an alcohol such as ethanol; a ketone such as cyclohexanone or methylisobutyl ketone; and/or an ether such as tetrahydrofuran or dioxane. It is also possible to contain inorganic particles such as of silicon dioxide or titanium dioxide, powder of polyimide, or the like for the purposes of restricting the thermal expansion coefficient, increasing the permittivity, decreasing the permittivity, or the like.

The photosensitive resin composition is preferably used in the form of a solution (varnish) containing an organic solvent. Specific examples of organic solvents include: ethers such as ethylene glycol monomethyl ether, ethylene glycol monoethyl ether, propylene glycol monomethyl ether, propylene glycol monoethyl ether, ethylene glycol dimethyl ether, ethylene glycol diethyl ether, and ethylene glycol dibutyl ether; acetates such as ethylene glycol monoethyl ether acetate, propylene glycol monomethyl ether acetate, propyl acetate, butyl acetate, isobutyl acetate, 3-methoxybutyl acetate, 3-methyl-3-methoxybutyl acetate, methyl lactate, ethyl lactate, butyl lactate, and ethyl acetoacetate; ketones such as acetone, methylethyl ketone, acetylacetone, methylpropyl ketone, methylbutyl ketone, methylisobutyl ketone, cyclopentanone, and 2-heptanone; alcohols such as butyl alcohol, isobutyl alcohol, pentanol, 4-methyl-2-pentanol, 3-methyl-2-butanol, 3-methyl-3-methoxy butanol, and diacetone alcohol; aromatic hydrocarbons such as toluene and xylene; others such as N-methyl-2-pyrrolidone, N-cyclohexyl-2-pyrrolidone, N,N-dimethylformamide, N,N-dimethyl acetamide, dimethyl sulfoxide, and $\gamma$-butyrolactone; and the like.

In addition, the varnish of the photosensitive resin composition may be filtrated using a paper filter or a filter before being applied. The filtration method is subject to no particular limitation, and is preferably a filtration performed under pressure using a filter for a retention particle diameter of 0.4 µm to 10 µm.

The viscosity of the varnish of the photosensitive resin composition can be adjusted suitably in accordance with the molecular weight of the compound (P) and the concentration of the solution, and is preferably 2000 mPa·s or more, more preferably 5000 mPa·s or more. In addition, the viscosity is preferably 200000 mPa·s or less, more preferably 100000 mPa·s or less. For example, in cases where the varnish is applied to a base material using a spin coating method, the viscosity is preferably 2000 to 5000 mPa·s. In cases where the varnish is applied to a base material using a blade coater method or a die coater method, the viscosity is preferably 10000 to 50000 mPa·s.

(Shape of Barrier Rib)

FIG. 2 is a schematic cross-sectional view depicting an extract of the scintillator panel 2 portion in FIG. 1. However, the first reflecting layer 11 is omitted for the ease of understanding of the following description. The height L1 of the barrier rib 5 is preferably 50 µm or more, more preferably 70 µm or more. In addition, the height of the barrier rib 5 is preferably 3000 µm or less, more preferably 1000 µm or less. With L1 at 3000 µm or less, light emitted by the phosphor 14 itself is less easily absorbed, and the brightness of the scintillator panel 2 is further enhanced. On the other hand, with L1 at 50 µm or more, the scintillator panel 2 allows the phosphor 14 to be packed in a suitable amount therein, and exhibits further enhanced brightness.

The distance L2 between the adjacent barrier ribs 5 is preferably 30 µm or more, more preferably 40 µm or more. In addition, the distance L2 between the adjacent barrier ribs 5 is preferably 3000 µm or less, more preferably 2000 µm or less. With L2 at 30 µm or more, the phosphor 13 can be packed more easily in the cells of the scintillator panel 2. On the other hand, with L2 at 3000 µm or less, the scintillator panel 2 can produce an image having better sharpness.

The bottom width L3 of the barrier rib 5 is preferably 2 µm or more, more preferably 3 µm or more. In addition, the bottom width L3 is preferably 150 µm or less, more preferably 80 µm or less, still more preferably 50 µm or less. With L3 at 2 µm or more, the scintillator panel 2 is less prone to have a defect in the pattern. On the other hand, with L3 at 150 µm or less, the scintillator panel 2 allows the phosphor 13 to be packed in a suitable amount therein, and is less prone to cause a decrease in the brightness.

The top width L4 of the barrier rib 5 is preferably 2 µm or more, more preferably 3 µm or more. In addition, the top width L4 is preferably 80 µm or less, more preferably 50 µm or less, still more preferably 20 µm or less. With L4 at 2 µm or more, the strength of the barrier rib 5 is suitable, and the scintillator panel 2 is less prone to have a defect in the pattern. On the other hand, with L4 at 80 µm or less, the scintillator panel 2 has a suitable region over which light emitted by the phosphor 14 can be taken out. Thus, the brightness is further enhanced.

An aspect ratio (L1/L3) of the height L1 of the barrier rib 5 to the bottom width L3 of the barrier rib 5 is preferably 5.0 or more, more preferably 10.0 or more, still more preferably 12.0 or more. In addition, the aspect ratio (L1/L3) is preferably 100.0 or less, more preferably 50.0 or less. With the aspect ratio (L1/L3) at 5.0 or more, the scintillator panel 2 allows the phosphor 14 to be packed in a suitable amount therein, and is less prone to cause a decrease in the X-ray absorption efficiency. In addition, with the aspect ratio (L1/L3) at 100.0 or less, the strength of the barrier rib in the scintillator panel 2 is more likely to be suitable.

An aspect ratio (L1/L2) of the height L1 of the barrier rib 5 to the distance L2 between the barrier ribs 5 is preferably 0.5 or more, more preferably 1.0 or more. In addition, the aspect ratio (L1/L2) is preferably 20.0 or less, more preferably 10.0 or less. With the aspect ratio (L1/L2) at 0.5 or more, the scintillator panel 2 is less prone to cause a decrease in the X-ray absorption efficiency. In addition, with the aspect ratio (L1/L2) at 20.0 or less, the scintillator panel 2 is less prone to cause a decrease in the takeout efficiency of light, and exhibits further enhanced brightness. However, as illustrated FIG. 3, the above description may be inapplicable in cases where the distance L2 between the barrier ribs 5 is different between the length (L2(X)) in the X-axis direction and the length (L2(Y)) in the Y-axis direction. In cases where the X-axis direction and the Y-axis direction are set as per L2(X)>L2(Y), the aspect ratio (L1/L2(X)) of the height L1 of the barrier rib 5 is preferably 0.05 or more, more preferably 0.2 or more. In addition, the aspect ratio (L1/L2 (X)) is preferably 10.0 or less, more preferably 5.0 or less.

A ratio (L4/L3) of the top width L4 to the bottom width L3 of the barrier rib 5 is preferably 0.5 or more, more preferably 0.7 or more. Having the ratio at 0.5 or more makes it possible to maintain the intensity of the barrier rib, and at the same time, to increase the amount of the phosphor.

The height L1 of the barrier rib 5 and the distance L2 between the adjacent barrier ribs 5 can be measured by cutting out a cross section perpendicular to a substrate or baring a cross section using a polishing device such as a cross-section polisher, and then observing the cross section under a scanning electron microscope. Here, the width of the barrier rib 5 across the contact portion between the barrier rib 5 and the substrate is denominated L3. In addition, the width of the top portion of the barrier rib 5 is denominated L4.

(First Reflecting Layer)

In a scintillator panel according to an embodiment of the present invention, the barrier rib 5 preferably has a metal-containing reflecting layer (first reflecting layer) 11 on the surface thereof. The first reflecting layer 11 is preferably provided on at least a part of the barrier rib 5. Even if a thin film, the first reflecting layer 11 has a high reflectance. Accordingly, having the first reflecting layer 11 that is a thin film makes it less likely to decrease the packing amount of the phosphor 13, and the scintillator panel 2 exhibits further enhanced brightness.

The metal constituting the first reflecting layer 11 is subject to no particular limitation. In one example, the first reflecting layer 11 preferably contains, as a main component, a metal having a high reflectance, such as silver or aluminum, more preferably contains silver as a main component. The first reflecting layer 11 may be of an alloy. In particular, the metal constituting the first reflecting layer 11 is preferably a silver alloy containing palladium and copper. The first reflecting layer 11 composed of such a silver alloy has excellent discoloration resistance in the air. In an embodiment of the present invention, "containing as a main component" refers to containing a predetermined component at 50 to 100 mass %.

The first reflecting layer 11 is not limited to any particular thickness. For example, the first reflecting layer 11 preferably has a thickness of 10 nm or more, more preferably 50 nm or more. In addition, the first reflecting layer 11 preferably has a thickness of 1000 nm or less, more preferably 500 nm or less. The first reflecting layer 11 having a thickness of 10 nm or more makes it possible that the scintillator panel 2 achieves sufficient light blocking, thus affording an image having higher sharpness. The first reflecting layer 11 having a thickness of 1000 nm or less makes it less likely to make the roughness of the surface of the first reflecting layer 11 large, and to decrease the reflectance.

(Protective Layer)

A scintillator panel according to an embodiment of the present invention preferably has a protective layer 12 on the surface of the first reflecting layer 11. Even in cases where, for example, an alloy lacking in discoloration resistance in the air is used for the first reflecting layer 11, providing the protective layer 12 makes it possible to decrease the discoloration, to inhibit the reflectance of the first reflecting layer 11 from being decreased by reaction between the first reflecting layer 11 and the phosphor layer 6, and to further enhance the brightness. The protective layer 12 may be further provided between the barrier rib 5 and the first reflecting layer 11. Providing the protective layer 12 between the barrier rib 5 and the first reflecting layer 11 makes it possible to inhibit the reflectance of the first reflecting layer 11 from being decreased by reaction between the barrier rib 5 and the first reflecting layer 11, and to further enhance the brightness.

For the protective layer 12, any of an inorganic protective layer and an organic protective layer can be used suitably. An inorganic protective layer and an organic protective layer can be combined into a laminate, and used as the protective layer 12.

(Inorganic Protective Layer)

An inorganic protective layer has low water-vapor permeability, and hence, is suitable as the protective layer 12. An inorganic protective layer can be formed by a known technique such as a sputtering method. The inorganic protective layer is not limited to any particular material. Examples of materials for an inorganic protective layer include: oxides such as silicon oxide, indium tin oxide, and gallium zinc oxide; nitrides such as silicon nitride; fluorides such as magnesium fluoride; the like. Among these, silicon oxide or silicon nitride is preferably used as a material for an inorganic protective layer because of having low water-vapor permeability and in addition, being less prone to decrease the reflectance of silver in the formation of an inorganic protective layer.

The inorganic protective layer is not limited to any particular thickness. For example, the inorganic protective layer preferably has a thickness of 2 nm or more, more preferably 5 nm or more. In addition, the inorganic protective layer preferably has a thickness of 300 nm or less, more preferably 100 nm or less. Having a thickness of 2 nm or more makes it possible to increase the effect of inhibiting the brightness of the scintillator panel 2 from decreasing in a high-temperature and high-humidity environment. Having a thickness of 300 nm or less makes it possible to inhibit coloration from being caused by the inorganic protective layer, and to further enhance the brightness. The thickness of the inorganic protective layer can be measured in the same method as the thickness of the below-mentioned organic protective layer.

(Organic Protective Layer)

The organic protective layer is preferably a polymer compound having excellent chemical durability, and preferably contains, for example, a polysiloxane or an amorphous fluorine resin as a main component.

In an embodiment of the scintillator panel, examples of polysiloxanes include a hydrolysate or partial condensate of an organosilane that encompasses an organosilane represented by the general formula (3).

[Chem. 5]

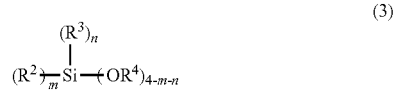
(3)

In the general formula (3), $R^2$ represents a monovalent organic group having at least one of an epoxy group and an acid anhydride group. $R^3$ and $R^4$ independently represents hydrogen, a $C_1$-$C_6$ alkyl group, $C_2$-$C_6$ acyl group, or $C_6$-$C_{16}$ aryl group. m represents an integer of 1 to 3. n represents an integer of 0 to 2. m+n is 1 to 3. When m is 2 or greater, a plurality of $R^2$s may be the same or different. Additionally, when n is 2, a plurality of $R^3$s may be the same or different. Additionally, when m+n is 2 or smaller, a plurality of $R^4$s may be the same or different.

An amorphous fluorine resin has excellent solvent solubility, and hence, can be easily formed using a known technique, for example, performing solution application or spray coating on the protective layer 12. Here, that "a fluorine resin is amorphous" means that, as a fluorine-containing resin is measured by powder X-ray diffraction, no substantial peak attributable to a crystal structure is observed, and that only a broad halo is observed.

The amorphous fluorine resin is preferably a copolymer having, as a repeating unit, a structure represented by the general formula (4), or having two different structures including a structure of the general formula (4).

[Chem. 6]

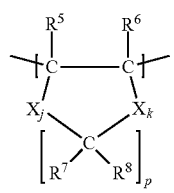
(4)

In cases where the amorphous fluorine resin is a copolymer, the copolymer may be any one of an alternating copolymer, block copolymer, and random copolymer.

In the general formula (4), X represents oxygen, j and k independently represent 0 or 1, and p is an integer of 1 or greater.

In the general formula (4), $R^5$ to $R^8$ independently represent hydrogen, halogen, a substituted or unsubstituted alkyl group, substituted or unsubstituted alkenyl group, substituted or unsubstituted alkynyl group, hydroxyl group, substituted or unsubstituted alkoxy group, substituted or unsubstituted aryl group, cyano group, aldehyde group, substituted or unsubstituted ester group, acyl group, carboxyl group, substituted or unsubstituted amino group, nitro group, or substituted or unsubstituted epoxy group. At least one of $R^5$ and $R^6$ is preferably fluorine. In addition, at least one of $R^7$ and $R^8$ is preferably fluorine.

In the general formula (4), j and k represent the number of oxygens. However, in cases where j or k is 0, Xj or Xk is a single bond. When at least one of j and k is 1, the glass transition temperature is suitable, and hence, such j and k are preferable.

In the general formula (4), p represents a repeating number, and is preferably 1 to 4, more preferably 1 to 3.

Additionally, in cases where t is 2 or greater, a plurality of $R^7$s and $R^8$s may the same or different.

In the general formula (4), the alkyl group preferably has 1 to 8 carbon atoms. The alkenyl group preferably has 1 to 12 carbon atoms. The alkoxy group preferably has 1 to 10 carbon atoms. The aryl group preferably has 5 to 15 carbon atoms.

The organic protective layer preferably has a thickness of 0.05 μm or more, more preferably 0.2 μm or more. In addition, the organic protective layer preferably has a thickness of 10 μm or less, more preferably 5 μm or less. The organic protective layer having a thickness of 0.05 μm or more makes it possible to increase the effect of inhibiting the brightness of the scintillator panel 2 from decreasing. In addition, the organic protective layer having a thickness of 10 μm or less makes it possible that, in the scintillator panel 2, the cell is increased in volume, and packed with a sufficient amount of the phosphor 14, and thus that the brightness is further enhanced. In an embodiment of the present invention, the thickness of the organic protective layer can be measured by observation under a scanning electron microscope. In this regard, the organic protective layer formed in the below-mentioned organic protective layer forming step tends to have a smaller thickness on the side of the barrier rib near the top and a larger thickness on the side of the barrier rib near the bottom. Accordingly, in cases where the thickness varies in such a manner, the thickness of the organic protective layer refers to the thickness on the side of the barrier rib 5 at the central portion in the height direction.

(Second Reflecting Layer)

In a scintillator panel according to an embodiment of the present invention, the protective layer 12 preferably has a second reflecting layer (second reflecting layer) 13 on the surface thereof. The second reflecting layer 13 is preferably provided on at least a part of the protective layer 12. Providing the second reflecting layer 13 makes it easier that light emitted by the phosphor layer 6 emerges on the surface more efficiently, and thus, the brightness of the scintillator panel 2 is enhanced further.

The second reflecting layer 13 preferably contains a metal oxide, and the metal oxide is subject to no particular limitation. In one example, the second reflecting layer 13 preferably contains, as a main component, a metal oxide having a high refractive index, such as titanium oxide, zirconium oxide, zinc oxide, or aluminum oxide, and more preferably contains titanium oxide as a main component. In an embodiment of the present invention, "containing as a main component" refers to containing a predetermined component at 50 to 100 mass %.

The metal oxide is preferably has a refractive index of 1.6 or more, more preferably 1.8 or more. Having a refractive index of 1.6 or more makes it possible that the difference in the refractive index between the metal oxide and the air is increased, and that the reflectance is more easily enhanced at the second reflecting layer 13.

The metal oxide preferably has a particulate shape. Having a particulate shape makes it less likely that, when light emitted by the phosphor layer is reflected by the reflecting layer, the reflectance varies, and makes it more likely that the light emitted emerges on the surface more efficiently, thus further enhancing the brightness of the scintillator panel 2.

In cases where the metal oxide has a particulate shape, the average particle diameter thereof is preferably 100 to 1000 nm, more preferably 150 to 700 nm. The metal oxide having an average particle diameter of 100 nm or more further enhances the reflectance with respect to the wavelength of light emitted by the phosphor, and thus enhancing the brightness more easily. On the other hand, having an average particle diameter of 1000 nm or less allows the density of the particles in the second reflecting layer to be larger, and even if the layer is a thin film, the reflectance is enhanced further, and thus, the brightness is more likely to be enhanced.

Here, the average particle diameter of a metal oxide in the present invention refers to a particle diameter corresponding to 50% in the cumulative distribution of the particle size, and can be measured using a particle size distribution analyzer (for example, an MT3300 manufactured by Nikkiso Co., Ltd.). More specifically, a metal oxide is introduced into a sample chamber filled with water, and ultrasonicated for 300 seconds. Then, a measurement is made of a particle size distribution, according to which the particle diameter corresponding to 50% in the cumulative distribution is regarded as the average particle diameter.

The second reflecting layer 13 may contain a polymer compound other than a metal oxide. The second reflecting layer 13 containing a polymer compound makes it more likely that, in the below-mentioned phosphor layer packing step, the second reflecting layer 13 is inhibited from being detached from the protective layer 12, and that the metal oxide particles in the second reflecting layer 13 is inhibited from being detached.

(Phosphor Layer)

A scintillator panel according to an embodiment of the present invention has a phosphor in a cell defined by the barrier rib.

The phosphor layer 6 absorbs the energy of radiation such as incident X-rays, and emits electromagnetic waves in the wavelength range of from 300 nm to 800 nm, that is, light in the range of from ultraviolet light to infrared light with visible light in the center therebetween. The light emitted by the phosphor layer 6 is photoelectrically converted in the photoelectric conversion layer 8, and outputted as electric signals through the output layer 9. The phosphor layer 6 preferably has a phosphor 14 and a binder resin 15.

(Phosphor)

The phosphor 14 is not subject to any particular limitation. Examples of the phosphor 14 include sulfide phosphors, germanate phosphors, halide phosphors, barium sulfate phosphors, hafnium phosphate phosphors, tantalate phosphors, tungstate phosphors, rare earth silicate phosphors, rare earth oxysulfide phosphors, rare earth phosphate phosphors, rare earth oxyhalide phosphors, alkaline earth metal phosphate phosphors, and alkaline earth metal fluorohalide phosphors. Examples of rare earth silicate phosphors include cerium-activated rare earth silicate phosphors. Examples of rare earth oxysulfide phosphors include praseodymium-activated rare earth oxysulfide phosphors, terbium-activated rare earth oxysulfide phosphors, and europium-activated rare earth oxysulfide phosphors. Examples of rare earth phosphate phosphors include terbium-activated rare earth phosphate phosphors. Examples of rare earth oxyhalogen phosphors include terbium-activated rare earth oxyhalide phosphors and thulium-activated rare earth oxyhalide phosphors. Examples of alkaline earth metal phosphate phosphors include europium-activated alkaline earth metal phosphate phosphors. Examples of alkaline earth metal fluorohalide phosphors include europium-activated alkaline earth metal fluorohalide phosphors. The phosphor 14 may be a combination of these. Among these, a preferable phosphor as the phosphor 14 is selected from halide phosphors, praseodymium-activated rare earth oxysulfide phosphor, terbium-activated rare earth oxysulfide phosphors, and europium-activated rare earth oxysulfide phosphors from the viewpoint of high light emission efficiency. A phosphor selected from praseodymium-activated rare earth oxysulfide phosphors and terbium-activated rare earth oxysulfide phosphors is more preferable.

The phosphor 14 preferably has an average particle diameter of 0.5 to 50 μm, more preferably 3.0 to 40 μm, still more preferably 4.0 to 30 μm. The phosphor having an average particle diameter of 0.5 μm or more makes it possible to further enhance the efficiency of converting radiation into visible light, and to further enhance the brightness. In addition, such an average particle diameter makes it possible to inhibit the agglomeration of the phosphor particles. On the other hand, the phosphor having an average particle diameter of 50 μm or less enables the surface of the phosphor layer to have excellent smoothness, and makes it possible to inhibit a bright spot from being generated on the image.

Here, the average particle diameter of the phosphor 14 in the present invention refers to a particle diameter corresponding to 50% in the cumulative distribution of the particle size, and can be measured using a particle size distribution analyzer (for example, MT3300 manufactured by Nikkiso Co., Ltd.). More specifically, a phosphor is introduced into a sample chamber filled with water, and ultrasonicated for 300 seconds. Then, a measurement is made of a particle size distribution, according to which the particle diameter corresponding to 50% in the cumulative distribution is regarded as the average particle diameter.

(Binder Resin)

The binder resin 15 is subject to no particular limitation. Examples of the binder resin 15 include thermoplastic resins, thermosetting resins, photo-curable resins, and the like. More specific examples of the binder resin 15 include: acrylic resins; acetal resins; cellulose derivatives; polysiloxane resins; epoxy compounds; melamine resins; phenolic resins; urethane resins; urea resins; vinyl chloride resins; polyvinyl acetal; polyester resins such as polyethylene terephthalate and polyethylene naphthalate; polyethylene; polypropylene; polycarbonate; polystyrene; polyvinyl toluene; and polyphenyl benzene; and the like. From among these, the binder resin 15 preferably contains at least one of acrylic resins, epoxy resins, cellulose derivatives, epoxy resins, polyvinyl acetal, and polyester resins, and more preferably contains one to three of these as (a) main component(s). This makes it possible to inhibit light from being attenuated in a cell in the scintillator panel 2, thus making it easier to take out emitted light sufficiently. In this regard, containing, as (a) main component(s), at least one of acrylic resins, cellulose derivatives, epoxy resins, polyvinyl acetal, and polyester resins means that the total amount of the acrylic resin, cellulose derivative, epoxy resin, polyvinyl acetal, and polyester resin is 50 to 100 mass % of the materials constituting the resin.

The binder resin 15 is preferably in contact with the protective layer 12. In this case, the binder resin 15 is preferably in contact with at least a part of the protective layer 12. This makes it less likely that the phosphor 14 comes off a cell in the scintillator panel 2. In this regard, as depicted in FIG. 1, the binder resin 15 may be packed with almost no space in a cell, or may be packed with some space.

As above-mentioned, a scintillator panel 2 according to an embodiment of the present invention makes it possible to obtain an image having high brightness and high sharpness.

(Method of Producing Scintillator Panel)

A method of producing a scintillator panel according to an embodiment of the present invention includes: a barrier rib forming step of forming a barrier rib on a substrate to define cells; a reflecting layer forming step of forming a metal reflecting layer on the surface of said barrier rib; a packing step of packing a phosphor in the cells defined by said barrier rib; wherein said barrier rib contains one or more compounds (P) selected from the group consisting of polyimides, polyamides, polyamideimides, and polybenzoxazoles and a structure derived from an epoxy compound. Below, each step will be described. In this regard, the description of the matters corresponding to the matters described in the above-mentioned embodiments of a scintillator panel will be omitted from the following description as appropriate.

(Barrier Rib Forming Step)

The barrier rib forming step is a step in which the barrier rib is formed on a substrate to define cells. A method of forming the barrier rib on the substrate is subject to no particular limitation. The barrier rib contains the above-mentioned compound (P) and a structure derived from an epoxy compound. As a method of forming a barrier rib, any kind of known method can be utilized. Photolithography is preferable from the viewpoint of easy shape control.

In a method of forming a barrier rib containing the compound (P), a barrier rib can be formed, for example, by the following: a coating step in which the surface of a substrate is coated with a photosensitive resin composition containing the compound (P) to obtain a coating film; and a pattern forming step in which the coating film is exposed and developed to obtain a barrier rib pattern.

The coating step is a step in which the surface of the substrate is wholly or partially coated with the above-mentioned photosensitive resin composition to obtain a coating film. Examples of a method of applying a photosensitive resin composition include a screen printing method, a bar coater method, a roll coater method, a die coater method, and a blade coater method. The thickness of the coating film to be obtained can be adjusted by the number of times of application, the mesh size of the screen, the viscosity of the photosensitive resin composition, or the like.

Next, the photosensitive resin composition coating film formed by the above-mentioned method is irradiated with actinic rays through a mask having a desired pattern, and thus exposed. Examples of actinic rays to be used for the exposure include ultraviolet rays, visible rays, an electron beam, X rays, or the like. In the present invention, the i-line (365 nm), h-line (405 nm), or g-line (436 nm) of the mercury lamp is preferably used.

To form a pattern, the exposure is followed by removing the exposed portion with a developer. Examples of preferable developers include: an aqueous solution of tetramethylammonium hydroxide; and an aqueous solution of a compound exhibiting alkalinity, such as diethanol amine, diethylaminoethanol, sodium hydroxide, potassium hydroxide, sodium carbonate, potassium carbonate, triethylamine, diethylamine, methylamine, dimethylamine, dimethylaminoethyl acetate, dimethylamino ethanol, dimethylaminoethyl methacrylate, cyclohexylamine, ethylenediamine, or hexamethylenediamine. In addition, such an aqueous alkali solution optionally contains the following: a polar solvent such as N-methyl-2-pyrrolidone, NN-dimethylformamide, N,N-dimethyl acetamide, dimethyl sulfoxide, γ-butyrolactone, or dimethylacrylamide; an alcohol such as methanol, ethanol, or isopropanol; an ester such as ethyl lactate or propylene glycol monomethyl ether acetate; a ketone such as cyclopentanone, cyclohexanone, isobutyl ketone, or methylisobutyl ketone; or the like. The solution may contain these singly or in combination of two or more kinds thereof.

The development can be performed, for example, by the following method: spraying the above-mentioned developer onto the coating face; building up a developer on the coating film face; immersing the coating film in a developer; or such immersion followed by ultrasonication. The development conditions such as the developing time and the temperature of the developer in the developing step are preferably conditions that make it possible to form a pattern with the exposed portion removed.

The development is preferably followed by a rinsing treatment with water. Here, the rinsing treatment may be performed with water supplemented with the following: an alcohol such as ethanol or isopropyl alcohol; an ester such as ethyl lactate or propylene glycol monomethyl ether acetate; or the like.

In addition, the development may be preceded by a baking treatment, as required. This results in enhancing the resolution of the pattern developed and increases the tolerable range of the development conditions in some cases. The baking temperature is preferably in the range of from 50 to 180° C., more preferably in the range of from 60 to 120° C., in particular. The time is preferably 5 seconds to several hours.

After the pattern is formed, the unreacted cationic polymerizable compound and the cationic polymerization initiator remain in the coating film of the photosensitive resin composition. Because of this, there are some cases where these are thermally decomposed to generate gas during the below-mentioned thermal cross-linking reaction. To avoid this, it is preferable that the whole face of the resin composition coating after the formation of the pattern is irradiated with the above-mentioned exposure light to generate acid from the cationic polymerization initiator. Such an operation makes it possible that, during the thermal cross-linking reaction, the reaction of the unreacted cationic polymerizable compound progresses, so that the generation of gas derived from the thermal decomposition is inhibited.

After the development, a temperature of 120° C. to 300° C. is applied to allow the thermal cross-linking reaction to progress. The cross-linking makes it possible to enhance the heat resistance and the chemical resistance. A method for this heating treatment can be selected from the following: a method in which the temperature is raised stepwise to a temperature selected; or a method in which the treatment is performed for 5 minutes to 5 hours while the temperature is continuously raised within a temperature range selected.

In a method of producing a scintillator panel according to an embodiment of the present invention, the base material used during the formation of a barrier rib may be used as a substrate of the scintillator panel, or it is also possible that a barrier rib is formed on a support, the barrier rib is peeled from the support, and then, the barrier rib peeled off is mounted on a substrate, and used. A method that can be used to peel the barrier rib from the base material is any known technique such as a technique in which a peeling assisting layer is provided between the base material and the barrier rib.

In a method of producing a scintillator panel according to an embodiment of the present invention, the substrate may keep fixed to the support when the barrier rib is formed. Fixing the substrate to the support makes it possible to retain the smoothness of the substrate, thus making it possible to decrease variations in the height of the barrier rib in the barrier rib forming step.

It is preferable that the substrate can be peeled from the support after the below-mentioned step of producing a scintillator panel. Enabling the substrate to be peeled from the support makes it possible to inhibit the support from absorbing the radiation incident on the scintillator panel. This results in making it possible to provide a sufficient dose of radiation incident on the scintillator panel, and thus enhancing the brightness further.

The support is not limited to any particular material as long as the support has higher mechanical strength than the substrate and has smoothness. The support is preferably glass.

The thickness of the support can be adjusted suitably, as required, and is preferably 0.3 mm or more, more preferably 0.5 mm or more, from a mechanical strength viewpoint.

A method of fixing the substrate to the support is subject to no particular limitation as long as the method is a known method. Examples of a method of fixing a substrate composed of a polymer material to a glass support include: a method in which an adhesive tape is bonded to the periphery of the substrate; a method in which the surface of one of the materials is coated with a liquid resin, with which the other is brought in contact and bonded; a method in which an adhesive film is bonded to one of the materials, to which film the other is bonded under pressure; a method in which one of the materials is surface-treated and fixed by intermolecular interaction; and the like. Among these, a method in which an adhesive film is bonded to one of the materials, to which film the other is bonded under pressure is preferable.

In addition, examples of a method of fixing a glass substrate to a glass support include: a method in which one of the materials is surface-treated and fixed by intermolecular interaction; a method in which a layer containing a low-melting-point glass is formed on one of the materials, and fixed to the other by sintering; and the like. Among these, a method in which a layer containing a low-melting-point glass is formed on one of the materials, and fixed to the other by sintering is preferable.

(Reflecting Layer Forming Step)

A scintillator panel according to an embodiment of the present invention includes a reflecting layer forming step of forming a metal reflecting layer (first reflecting layer) on the surface of the barrier rib. The first reflecting layer is preferably formed on at least a part of the barrier rib.

The first reflecting layer is not limited to any particular forming method. For example, the first reflecting layer can be formed by the following: a vacuum film-forming method such as a vacuum evaporation method, sputtering method, or CVD method; a plating method; a paste application method; or a spray method based on spraying. Among these, a sputtering method is preferable because a first reflecting layer formed by a sputtering method has higher reflectance uniformity and corrosion resistance than the first reflecting layer formed by another technique.

(Inorganic Protective Layer Forming Step)

In this regard, a method of producing a scintillator panel according to an embodiment of the present invention may include an inorganic protective layer forming step of forming an inorganic protective layer on the surface of the reflecting layer. The inorganic protective layer is not limited to any particular forming method. For example, the inorganic protective layer can be formed by the following: a vacuum film-forming method such as a vacuum evaporation method, sputtering method, or CVD method; a paste application method; or a spray method based on spraying. Among these, a sputtering method is preferable because an inorganic protective layer formed by a sputtering method has higher uniformity and corrosion resistance than the inorganic protective layer formed by another technique.

(Organic Protective Layer Forming Step)

A method of producing a scintillator panel according to an embodiment of the present invention may include an organic protective layer forming step of forming an organic protective layer on the surface of the reflecting layer. The organic protective layer is not limited to any particular forming method. For example, an organic protective layer can be formed by applying a solution of a polysiloxane or an amorphous fluorine-containing resin to the barrier rib substrate under vacuum, and then drying the solution to remove the solvent.

In cases where a polysiloxane is used, the substrate dried is preferably cured at a higher temperature than the drying temperature. Through the curing, the substrate undergoes the progress of condensation of the polysiloxane, thus making it easier to enhance the heat resistance and the chemical resistance, and to enhance the initial brightness of the scintillator panel.

(Second Reflecting Layer Forming Step)

A method of producing a scintillator panel according to an embodiment of the present invention may include a second reflecting layer forming step of forming a second reflecting layer on the surface of the inorganic protective layer or the organic protective layer. The second reflecting layer is not limited to any particular forming method. In light of the simplicity of the process and the capability of forming a second reflecting layer homogeneously over a large area, one example is a method in which a second reflecting layer paste obtained by mixing a metal oxide powder and a resin with a solvent is applied to a barrier rib substrate under vacuum, then drying the paste to remove the solvent.

(Packing Step)

A method of producing a scintillator panel according to an embodiment of the present invention includes a packing step of packing a phosphor in a cell defined by the barrier rib. The method of packing a phosphor is subject to no particular limitation. In light of the simplicity of the process and the capability of packing a phosphor homogeneously over a large area, one example of such a packing method is preferably a method in which a phosphor paste obtained by mixing a phosphor powder and a binder resin with a solvent is applied to a barrier rib substrate under vacuum, then drying the paste to remove the solvent.

As above-mentioned, a method of producing a scintillator panel according to an embodiment of the present invention makes it possible that the resulting scintillator affords an image having high brightness and high sharpness.

EXAMPLES

The present invention will be described in more detail below by way of Examples and Comparative Examples. The present invention is not to be limited thereto. The compounds used in Examples and Comparative Examples were synthesized by the below-mentioned methods.

(Barrier Rib Material)

Synthesis Example 1

(Raw Materials for Polyimide A)
Amine compound: 2,2-bis(3-amino-4-hydroxyphenyl) hexafluoropropane (hereinafter referred to as BAHF, manufactured by Tokyo Chemical Industry Co., Ltd.)
Acid anhydride: RIKACID (registered trademark) TDA-100 (manufactured by New Japan Chemical Co., Ltd.)

Solvent: γ-butyrolactone (hereinafter referred to as GBL, manufactured by Fujifilm Wako Pure Chemical Corporation)
(Synthesis of Polyimide A)

Under a dry nitrogen gas stream, 29.30 g (0.08 mol) of BAHF was added to 80 g of GBL, and dissolved with stirring at 120° C. Next, to the resulting mixture, 30.03 g (0.1 mol) of TDA-100 together with 20 g of GBL was added, and the resulting mixture was stirred at 120° C. for 1 hour, and then stirred at 200° C. for 4 hours to obtain a reaction solution. Next, the reaction solution was added to 3 L of water to gather a white precipitate. This precipitate was collected by filtration, washed with water three times, and then dried with a vacuum dryer at 80° C. for 5 hours to obtain a polyimide A.

Synthesis Example 2

(Raw Materials for Polyamide A)
Amine compound: BAHF (manufactured by Tokyo Chemical Industry Co., Ltd.)
Acid chloride: 4,4'-diphenyl ether dicarboxylic dichloride (manufactured by Tokyo Chemical Industry Co., Ltd.)
Solvent: N-methyl-2-pyrrolidone (hereinafter referred to as NMP, manufactured by Fujifilm Wako Pure Chemical Corporation)
(Synthesis of Polyamide A)

Under a dry nitrogen gas stream, 29.3 g (0.08 mol) of BAHF was added to 100 g of NMP, and dissolved with stirring at room temperature. Then, with the reaction solution temperature maintained at −10 to 0° C., 29.5 g (0.1 mol) of 4,4'-diphenyl ether dicarboxylic dichloride was added in small installments to the solution. Upon completion of the addition, the resulting mixture was heated to room temperature, and continued to be stirred for 3 hours. Next, the reaction solution was added to 3 L of water to gather a white precipitate. This precipitate was collected by filtration, washed with water three times, and then dried with a vacuum dryer at 80° C. for 5 hours to obtain a polyamide A.

Synthesis Example 3

(Raw Materials for Polyamideimide A)
Amine compound: BAHF (manufactured by Tokyo Chemical Industry Co., Ltd.)
Acid anhydride: RIKACID (registered trademark) TDA-100 (manufactured by New Japan Chemical Co., Ltd.)
Acid chloride compound: 3-nitrobenzoyl chloride (manufactured by Tokyo Chemical Industry Co., Ltd.)
Reactive compound: propylene oxide (manufactured by Fujifilm Wako Pure Chemical Corporation)
Solvent A: acetone (manufactured by Tokyo Chemical Industry Co., Ltd.)
Solvent B: methylcellosolve (manufactured by Tokyo Chemical Industry Co., Ltd.)
Solvent C: GBL (manufactured by Fujifilm Wako Pure Chemical Corporation)
(Synthesis of Hydroxyl-Group-Containing Diamine Compound (a))

BAHF in an amount of 18.3 g (0.05 mol) was dissolved in 100 mL of acetone and 17.4 g (0.3 mol) of propylene oxide, and the resulting solution was cooled to −15° C. To this, a solution of 20.4 g (0.11 mol) of 3-nitrobenzoyl chloride dissolved in 100 mL of acetone was added dropwise. Upon completion of the dropwise addition, the resulting mixture was allowed to react at −15° C. for 4 hours, and then, returned to room temperature. A white solid precipitated was collected by filtration and dried in vacuo at 50° C.

The resulting white solid in an amount of 30 g was introduced in a 300 mL stainless-steel autoclave, and dispersed in 250 mL of methylcellosolve, and to the resulting dispersion liquid, 2 g of 5% palladium-carbon was added. Into this, hydrogen was introduced from a balloon, and a reduction reaction was allowed to progress at room temperature. After approximately two hours, no more deflation of the balloon was ascertained, and the reaction was terminated. Upon completion of the reaction, a palladium compound as a catalyst was removed by filtration, and the resulting product was concentrated with a rotary evaporator to obtain a hydroxyl-group-containing diamine compound (a).

(Synthesis of Polyamideimide A)

Under a dry nitrogen gas stream, 31.4 g (0.08 mol) of the hydroxyl-group-containing diamine compound (a) was added to 80 g of GBL, and the resulting mixture was stirred at 120° C. Next, to the resulting mixture, 30.0 g (0.1 mol) of TDA-100 together with 20 g of GBL was added, and the resulting mixture was stirred at 120° C. for 1 hour, and then stirred at 200° C. for 4 hours to obtain a reaction solution. Next, the reaction solution was added to 3 L of water to gather a white precipitate. This precipitate was collected by filtration, washed with water three times, and then dried with a vacuum dryer at 80° C. for 5 hours to obtain a polyamideimide A.

Synthesis Example 4

(Raw Materials for Polybenzoxazole Precursor A)
Raw material A: diphenyl ether-4,4'-dicarboxylic acid (manufactured by Tokyo Chemical Industry Co., Ltd.).
Raw material B: 1-hydroxy-1,2,3-benzotriazole (manufactured by Tokyo Chemical Industry Co., Ltd.)
Amine compound: BAHF (manufactured by Tokyo Chemical Industry Co., Ltd.)
Acid anhydride: 5-norbornene-2,3-dicarboxylic anhydride (manufactured by Tokyo Chemical Industry Co., Ltd.).
Solvent A: N-methyl-2-pyrrolidone (hereinafter referred to as NMP, manufactured by Fujifilm Wako Pure Chemical Corporation)
Solvent B: methanol (manufactured by Tokyo Chemical Industry Co., Ltd.).
(Synthesis of Polybenzoxazole Precursor A)

Under a dry nitrogen gas stream, 0.16 mol of a mixture of a dicarboxylic acid derivative obtained by allowing 41.3 g (0.16 mol) of diphenyl ether-4,4'-dicarboxylic acid and 43.2 g (0.32 mol) of 1-hydroxy-1,2,3-benzotriazole to react and 73.3 g (0.20 mol) of BAHF were dissolved in 570 g of NMP, and then, the resulting mixture was allowed to react at 75° C. for 12 hours. Next, to the resulting mixture, 13.1 g (0.08 mol) of 5-norbornene-2,3-dicarboxylic anhydride dissolved in 70 g of NMP was added. The resulting mixture was further stirred for 12 hours, and the reaction was terminated. After the reaction mixture was filtrated, the reaction mixture was introduced into a solution containing water and methanol at 3:1 (by volume ratio) to obtain a white precipitate. This precipitate was collected by filtration, washed with water three times, and then dried with a vacuum dryer at 80° C. for 24 hours to obtain a polybenzoxazole precursor A.

Synthesis Example 5

(Raw Materials for Polyimide B)
Amine compound: BAHF (manufactured by Tokyo Chemical Industry Co., Ltd.)
Acid anhydride: RIKACID (registered trademark) TDA-100 (manufactured by New Japan Chemical Co., Ltd.)
Solvent: GBL (manufactured by Fujifilm Wako Pure Chemical Corporation)
(Synthesis of Polyimide B)
Under a dry nitrogen gas stream, 36.63 g (0.1 mol) of BAHF was added to 80 g of GBL, and dissolved with stirring at 120° C. Next, to the resulting mixture, 24.02 g (0.08 mol) of TDA-100 together with 20 g of GBL was added, and the resulting mixture was stirred at 120° C. for 1 hour, and then stirred at 200° C. for 4 hours to obtain a reaction solution. Next, the reaction solution was added to 3 L of water to gather a white precipitate. This precipitate was collected by filtration, washed with water three times, and then dried with a vacuum dryer at 80° C. for 5 hours to obtain a polyimide B.

(Raw Materials for Photosensitive Polyimide Varnish)
Polyimide A: polyimide containing a carboxylic residue as an end of the molecular chain
Polyamide A: polyamide containing a carboxylic residue as an end of the molecular chain
Polyamideimide A: polyamideimide containing a carboxylic residue as an end of the molecular chain
Polybenzoxazole precursor A: polybenzoxazole precursor containing a carboxylic residue as an end of the molecular chain
Polyimide B: polyimide containing an amine residue as an end of the molecular chain
Phenolic resin A: "MARUKA LYNCUR" (registered trademark) M (manufactured by Maruzen Petrochemical Co., Ltd.)
Epoxy resin A: "jER" (registered trademark) 630 (manufactured by Mitsubishi Chemical Corporation)
Epoxy compound A: "TEPIC" (registered trademark) -VL (manufactured by Nissan Chemical Corporation)
Epoxy compound B: "CELLOXIDE" (registered trademark) 2081 (manufactured by Daicel Corporation)
Epoxy compound C: "SHOFREE" (registered trademark) PETG (manufactured by Showa Denko K.K.)
Acryl compound A: BP-6EM (manufactured by Kyoeisha Chemical Co., Ltd.)
Acryl compound B: "KAYARAD" (registered trademark) DPHA (manufactured by Nippon Kayaku Co., Ltd.)
Photo-acid generator A: "CPI" (registered trademark) -310B (manufactured by San-Apro Ltd.)
Photo-acid generator B: "CPI" (registered trademark) -410S (manufactured by San-Apro Ltd.)
Photo-radical polymerization initiator A: OXE02 (manufactured by Ciba Specialty Chemicals Co., Ltd.)
Silane coupling agent: KBM-403 (manufactured by Shin-Etsu Chemical Co., Ltd.)

(Measurement of Arithmetic Average Slope Angle)
A barrier rib substrate having a reflecting layer formed thereon was cut to give a cross section on which the reflecting layer on the side of the barrier rib was bared. Using a laser microscope VK-X200 (manufactured by Keyence Corporation), five places on the side of the barrier rib were photographed through an objective lens at a magnification ratio of 50×. A line roughness analysis was performed on a 20 μm long range in the center of the side of the barrier rib using the accessory analysis software. The average of the values of the five places was determined and regarded as an arithmetic average slope angle. Here, the arithmetic average slope angle is determined by arithmetically averaging a slope (slope angle) made by each minute portion of a curve given by measuring the surface shape. The smaller the value of the arithmetic average slope angle, the smoother the surface shape.

(Evaluation of Reflectance)
A spectrocolorimeter CM-2600D (manufactured by Konica Minolta, Inc.) was disposed on the surface of each scintillator panel having no packed phosphor layer yet, and the reflectance in the range of from 400 to 700 nm was measured using the SCI method. In respect of the resulting reflectance, the value at 550 nm was regarded as a value of reflectance of the first reflecting layer. Additionally, a relative value with respect to the reflectance in Comparative Example 1 as 100 was calculated, and regarded as the reflectance of the first reflecting layer. In Example 10, the reflectance obtained was regarded as a value of reflectance of the second reflecting layer, and a relative value with respect to the reflectance in Comparative Example 1 as 100 was calculated, and regarded as the reflectance of the second reflecting layer.

(Evaluation of Brightness)
Each scintillator panel having a phosphor layer packed therein was arranged in the center of the surface of the sensor of an X-ray detector PaxScan 2520V (manufactured by Varex Imaging Corporation) in such a manner that the cells of the scintillator panel and the pixels of the sensor corresponded one-to-one to each other in alignment. An end of the substrate was fixed with an adhesive tape. Thus, a radiation detector was produced. To this detector, X rays from an X-ray radiation device L9181-02 (manufactured by Hamamatsu Photonics K.K.) were radiated under conditions based on a tube voltage of 50 kV and a distance of 30 cm between the X-ray tube and the detector, whereby an image was acquired. The average of the digital values of the 256×256 pixels in the center of the light-emitting position of the scintillator panel in the image acquired was regarded as a brightness value. Thus, the brightness was measured. The brightness was outputted in arbitrary units, and hence, a relative value with respect to the brightness in Comparative Example 1 as 100 was calculated, and regarded as a brightness.

(Evaluation of Amount of X-Ray Absorption)
Each scintillator panel having a phosphor layer packed therein was arranged on a detection unit of a Model EMF123 X-ray spectrometer (manufactured by EMF Japan Co., Ltd.). To this scintillator panel, X rays from an X-ray radiation device L9181-02 (manufactured by Hamamatsu Photonics K.K.) were radiated under conditions based on a tube voltage of 50 kV and a distance of 30 cm between the X-ray tube and the detector, during which a spectrum of the number of photons was acquired. The total number of photons of the spectrum acquired was regarded as the amount of X-ray transmission, and the amount of X-ray absorption of the scintillator panel was calculated from the total number of photons acquired in cases where X rays were radiated under conditions where no scintillator panel was present. In Examples, a relative value with respect to the amount of X-ray absorption in Comparative Example 1 as 100 was calculated, and regarded as the amount of X-ray absorption.

(Measurement of Mechanical Strength)
Each scintillator panel having a phosphor layer packed therein was disposed on a stage of an optical microscope OPTIPHOT 300 (manufactured by Nikon Corporation) in such a manner that the phosphor layer was on the objective lens side. With respect to this scintillator panel, how the top of the barrier rib was in the 500-pixel×500-pixel area in the center of the scintillator panel was observed. From the top of the barrier rib observed, the number of places where deformation such as wrinkling, fracture, and/or breakage was/were caused was calculated. In terms of how the top of the barrier rib was, a scintillator that underwent deformation such as wrinkling, fracture, and/or breakage at 10 places or less rated A, 11 to 20 places B, and 21 places or more C.

Example 1

(Preparation of Varnish)

In GBL, 10 g (2.0 mmol) of the polyimide A obtained in Synthesis Example 1, 10 g (26.2 mmol) of the epoxy compound A ("TEPIC"-VL) as an epoxy compound, 0.6 g of the photo-acid generator A ("CPI"-310B) as a photo-acid generator, and 0.8 g of KBM-403 as a silane coupling agent were dissolved. The addition amount of the solvent was adjusted in such a manner that the solid concentration was 60 wt %, assuming that the additives other than the solvent were regarded as solids. Then, the resulting solution was filtrated under pressure with a filter having a retention particle diameter of 1 μm to obtain a photosensitive polyimide varnish.

(Production of Barrier Rib Substrate)

A PI film, 125 mm×125 mm×0.05 mm, was used as a substrate. The photosensitive polyimide varnish was applied to the surface of the substrate using a die coater so as to have a thickness of 100 μm after being dried. The varnish was dried to give a coating film of the photosensitive polyimide varnish.

Next, the coating film of the photosensitive polyimide varnish was exposed at a dose of 2000 mJ/cm$^2$ using a super high-pressure mercury lamp via a photomask (chromium mask having grid-like openings and having a pitch of 127 μm and a line width of 10 μm) the openings of which corresponded to a desired pattern. The coating film after exposure was developed in an aqueous solution of 2 mass % potassium hydroxide, and the unexposed portions were removed to obtain a grid-like pattern. The resulting grid-like pattern was cured by thermal cross-linking in the air at 200° C. for 60 minutes to form grid-like barrier ribs. A cross section of the barrier rib was bared by cutting, and photographed using a scanning electron microscope S2400 (manufactured by Hitachi, Ltd.). The height, bottom width, and top width of the barrier rib and the distance between the barrier ribs were measured.

(Formation of First Reflecting Layer and Inorganic Protective Layer)

A commercially available sputtering device and sputtering target were used. The sputtering was performed under conditions where the thickness of the metal would become 300 nm on a flat glass plate that was arranged in the vicinity of the barrier rib substrate. For the sputtering target, APC (manufactured by Furuya Metal Co., Ltd.) that was a silver alloy containing palladium and copper was used. After the first reflecting layer was formed, SiN as a protective layer was formed in the same vacuum batch so as to have a thickness of 100 nm on a glass substrate.

(Formation of Organic Protective Layer)

Fluorine-Containing Resin Solution

With 1 part by mass of "CYTOP" (registered trademark) CTL-809M as an amorphous fluorine-containing resin, 1 part by mass of a fluorine solvent CT-SOLV 180 (manufactured by AGC Inc.) as a solvent was mixed to produce a resin solution.

This resin solution was vacuum-printed on the barrier rib substrate having the first reflecting layer and the inorganic protective layer formed thereon. Then, the resulting product was dried at 90° C. for 1 hour, and furthermore, cured at 190° C. for 1 hour to form an organic protective layer. A triple ion milling device EMTIC3X (manufactured by Leica Microsystems GmbH) was used to bare a cross section of the barrier rib. The cross section was photographed under a field emission type scanning electron microscope (FE-SEM) Merlin (manufactured by Carl Zeiss AG). The thickness of the organic protective layer on the side of the barrier rib in the central portion in the height direction of the barrier rib in the barrier rib substrate was measured and found to be 1 μm.

(Phosphor)

Commercially available GOS: Tb phosphor powder (gadolinium oxysulfide doped with Tb) was used directly. The average particle diameter D50 measured using a particle size distribution analyzer MT3300 (manufactured by NIK-KISO Co., Ltd.) was 11 μm.

(Binder Resin of Phosphor Layer)

Raw materials used to produce a binder resin for a phosphor layer are as below-mentioned.

Binder resin: ETHOCEL (registered trademark) 7 cp (manufactured by The Dow Chemical Company)

Solvent: benzyl alcohol (manufactured by Fujifilm Wako Pure Chemical Corporation)

(Formation of Phosphor Layer)

With 5 parts by mass of a binder resin solution having a concentration of 10 mass %, 10 parts by mass of phosphor powder was mixed to produce a phosphor paste. This phosphor paste was vacuum-printed on the barrier rib substrate having a reflecting layer, inorganic protective layer, and organic protective layer formed thereon, and packed in such a manner that the volume fraction of the phosphor was 65%. The phosphor paste was dried at 150° C. for 15 minutes to form a phosphor layer.

Example 2

A varnish was prepared in the same manner as in Example 1 except that the polyamide A obtained in Synthesis Example 2 was used instead of the polyimide A in Example 1. The barrier rib substrate was produced, and then, the reflectance, brightness, and amount of X-ray absorption were measured.

Example 3

A varnish was prepared in the same manner as in Example 1 except that the polyamideimide A obtained in Synthesis Example 3 was used instead of the polyimide A in Example 1. The barrier rib substrate was produced, and then, the reflectance, brightness, and amount of X-ray absorption were measured.

Example 4

A varnish was prepared in the same manner as in Example 1 except that the polybenzoxazole precursor A obtained in Synthesis Example 4 was used instead of the polyimide A in Example 1. The barrier rib substrate was produced, and then, the reflectance, brightness, and amount of X-ray absorption were measured.

Example 5

A varnish was prepared in the same manner as in Example 1 except that the epoxy compound B was used instead of the epoxy compound A in Example 1. The barrier rib substrate was produced, and then, the reflectance, brightness, and amount of X-ray absorption were measured.

Example 6

A varnish was prepared in the same manner as in Example 1 except that the epoxy compound C was used instead of the epoxy compound A in Example 1. The barrier rib substrate was produced, and then, the reflectance, brightness, and amount of X-ray absorption were measured.

Example 7

A varnish was prepared in the same manner as in Example 1 except that the photo-acid generator B was used instead of the photo-acid generator A in Example 1. The barrier rib substrate was produced, and then, the reflectance, brightness, and amount of X-ray absorption were measured.

Example 8

A varnish was prepared in the same manner as in Example 1 except that the polyimide B obtained in Synthesis Example 5 was used instead of the polyimide A in Example 1, that 10 g of the epoxy compound A ("TEPIC"-VL) was changed to 5.0 g of the acryl compound A (BP-6EM) and 0.6 g of the acryl compound B ("KAYARAD" DPHA), and that 0.6 g of the photo-acid generator A ("CPI"-310B) was changed to 1.4 g of the photo-radical polymerization initiator A (OXE02). The barrier rib substrate was produced, and then, the reflectance, brightness, and amount of X-ray absorption were measured.

Example 9

A varnish was prepared in the same manner as in Example 1 except that the polyimide B obtained in Synthesis Example 5 was used instead of the polyimide A in Example 1. The barrier rib substrate was produced, and then, the reflectance, brightness, and amount of X-ray absorption were measured.

Example 10

A barrier rib substrate was produced in the same manner as in Example 1 except that the second reflecting layer was formed by the below-mentioned method. The barrier rib substrate was produced, and then, the reflectance, brightness, and amount of X-ray absorption were measured.
(Raw Materials for Second Reflecting Layer Paste)
Raw materials used to produce a second reflecting layer paste are as below-mentioned.
Metal oxide: titanium oxide (having an average particle diameter of 0.25 μm)
Polymer compound: ETHOCEL (registered trademark) 100 cp (manufactured by The Dow Chemical Company)
Solvent: terpineol
(Formation of Second Reflecting Layer)
With 1 part by mass of "ETHOCEL" (registered trademark) 100 cp as a binder resin, 90 parts by mass of a solvent (terpineol) was mixed, and the resulting mixture was dissolved under heating at 80° C. to obtain a resin solution. To the resulting resin solution, 9 parts by mass of titanium oxide was added, and the resulting mixture was kneaded to obtain a second reflecting layer paste.

This second reflecting layer paste was vacuum-printed on the barrier rib substrate having the first reflecting layer, inorganic protective layer, and organic protective layer formed thereon in Example 1. Then, the resulting product was dried at 90° C. for 1 hour to form a second reflecting layer. A triple ion milling device EMTIC3X (manufactured by Leica Microsystems GmbH) was used to bare a cross section of the barrier rib. The cross section was photographed under a field emission type scanning electron microscope (FE-SEM) Merlin (manufactured by Carl Zeiss AG). The thickness of the second reflecting layer on the side of the barrier rib in the central portion in the height direction of the barrier rib in the barrier rib substrate was measured and found to be 5 μm.

Example 11

A barrier rib substrate was produced in the same manner as in Example 1 except that the photomask was changed to a chromium mask having grid-like openings and having a pitch of 127 μm and a line width of 7 μm. The barrier rib substrate was produced, and then, the reflectance, brightness, and amount of X-ray absorption were measured.

Comparative Example 1

(Formation of Barrier Rib Substrate)
(Preparation of Photosensitive Acrylic Resin)
A photosensitive acrylic resin was prepared using the following raw materials.
Photosensitive monomer M-1: trimethylolpropane triacrylate
Photosensitive monomer M-2: tetrapropylene glycol dimethacrylate
Photosensitive polymer: a product (weight-average molecular weight, 43000; acid value, 100) obtained by addition reaction of 0.4 equivalents of glycidyl methacrylate with a carboxyl group of a copolymer composed of methacrylic acid/methyl methacrylate/styrene at a mass ratio of 40/40/30
Photo-radical polymerization initiator B: 2-benzyl-2-dimethylamino-1-(4-morpholinophenyl)butanone-1 (manufactured by BASF SE)
Polymerization inhibitor: 1,6-hexanediol-bis[(3,5-di-t-butyl-4-hydroxyphenyl)propionate])
Ultraviolet-ray absorber solution: 0.3 mass % γ-butyrolactone solution of Sudan IV (manufactured by Tokyo Ohka Kogyo Co., Ltd.)
Viscosity modifier: FLOWNON EC121 (manufactured by Kyoeisha Chemical Co., Ltd.)
Solvent: γ-butyrolactone (manufactured by Fujifilm Wako Pure Chemical Corporation)
In 38 parts by mass of the solvent, 4 parts by mass of the photosensitive monomer M-1, 6 parts by mass of the photosensitive monomer M-2, 24 parts by mass of the photosensitive polymer, 6 parts by mass of the photo-radical polymerization initiator B, 0.2 parts by mass of the polymerization inhibitor, and 12.8 parts by mass of the ultraviolet-ray absorber solution were dissolved under heating at a temperature of 80° C. to obtain a photosensitive acrylic resin solution.

A PI film, 125 mm×125 mm×0.05 mm, was used as a substrate. The photosensitive acrylic resin solution was applied to the surface of the substrate using a die coater so as to have a thickness of 100 μm after being dried. The varnish was dried to obtain a coating film of the photosensitive acrylic resin solution. Next, the coating film of the photosensitive acrylic resin solution was exposed at a dose of 300 mJ/cm$^2$ using a super high-pressure mercury lamp via a photomask (chromium mask having grid-like openings and having a pitch of 127 μm and a line width of 10 μm) the openings of which corresponded to a desired pattern. The coating film after exposure was developed in an aqueous solution of 0.5 mass % ethanol amine, and the unexposed portions were removed to obtain a grid-like pattern. The resulting grid-like pattern was dried in the air at 150° C. for 30 minutes to form grid-like barrier ribs. A cross section of the barrier rib was bared by cutting, and photographed using a scanning electron microscope S2400 (manufactured by Hitachi, Ltd.). The height, bottom width, and top width of the barrier rib and the distance between the barrier ribs were measured.

In the same manner as in Example 1, the resulting barrier rib substrate was used to form the first reflecting layer, inorganic protective layer, and organic protective layer, packed with a phosphor, and evaluated.

Comparative Example 2

A varnish was prepared in the same manner as in Example 1 except that the phenolic resin A was used instead of the polyimide A in Example 1. The barrier rib substrate was produced, and then, the reflectance, brightness, and amount of X-ray absorption were measured.

Comparative Example 3

A varnish was prepared in the same manner as in Example 1 except that the epoxy resin A was used instead of the polyimide A in Example 1. In addition, a barrier rib substrate was produced in the same manner as in Example 1 except that propylene glycol 1-monomethyl ether 2-acetate was used instead of an aqueous potassium hydroxide solution to develop the coating film in the barrier rib substrate forming step. The barrier rib substrate was produced, and then, the reflectance, brightness, and amount of X-ray absorption were measured.

Comparative Example 4

(Production of Glass Powder-Containing Paste)

To 50 parts by mass of the photosensitive acrylic resin produced in Comparative Example 1, 50 parts by mass of the low-softening-point glass powder was added, and then, the resulting mixture was kneaded in a three-roller kneader to obtain a glass powder-containing paste.
(Low-Softening-Point Glass Powder)

$SiO_2$, 27 mass %; $B_2O_3$, 31 mass %; ZnO, 6 mass %; $Li_2O$, 7 mass %; MgO, 2 mass %; CaO, 2 mass %; BaO, 2 mass %; $Al_2O_3$, 23 mass %; refractive index (ng) 1.56; glass softening temperature, 588° C.; thermal expansion coefficient, $70×10^{-7}$ ($K^{-1}$); average particle diameter, 2.3 μm.

A soda glass plate, 125 mm×125 mm×0.7 mm, was used as a substrate. The glass powder-containing paste was applied to the surface of the substrate and dried using a die coater so as to have a thickness of 100 μm after drying, thereby affording a coating film of the glass powder-containing paste. Next, the coating film of the glass powder-containing paste was exposed at a dose of 300 mJ/cm$^2$ using a super high-pressure mercury lamp via a photomask (chromium mask having grid-like openings and having a pitch of 127 μm and a line width of 10 μm) the openings of which corresponded to a desired pattern. The coating film after exposure was developed in an aqueous solution of 0.5 mass % ethanol amine, and the unexposed portions were removed to obtain a grid-like pattern yet to be fired. The resulting grid-like pattern yet to be fired was fired in the air at 580° C. for 15 minutes to form grid-like barrier ribs the main component of which was glass. A cross section of the barrier rib was bared by cutting, and photographed using a scanning electron microscope S2400 (manufactured by Hitachi, Ltd.). The height, bottom width, and top width of the barrier rib and the distance between the barrier ribs were measured.

In the same manner as in Example 1, the resulting barrier rib substrate was used to form the first reflecting layer, inorganic protective layer, and organic protective layer, packed with a phosphor, and evaluated.

The evaluation results in Examples 1 to 11 and Comparative Examples 1 to 4 are tabulated in Tables 1 and 2.

TABLE 1

| | Material for barrier rib | | | | | | |
|---|---|---|---|---|---|---|---|
| | Compound (P) | | | | Amount of epoxy | | |
| | Raw Materials | End of molecular chain | Phenolic hydroxyl group | Other raw materials | reflecting (*1) | Curing agent | Second layer |
| Example 1 | Polyimide A | Carboxylic residue ○ | | Epoxy compound A | 100 | Photo-acid generator A | — |
| Example 2 | Polyamide A | Carboxylic residue ○ | | Epoxy compound A | 100 | Photo-acid generator A | — |
| Example 3 | Polyamideimide A | Carboxylic residue ○ | | Epoxy compound A | 100 | Photo-acid generator A | — |
| Example 4 | Polybenzoxazole precursor A | Carboxylic residue ○ | | Epoxy compound A | 100 | Photo-acid generator A | — |
| Example 5 | Polyimide A | Carboxylic residue ○ | | Epoxy compound B | 100 | Photo-acid generator A | — |
| Example 6 | Polyimide A | Carboxylic residue ○ | | Epoxy compound C | 100 | Photo-acid generator A | — |
| Example 7 | Polyimide A | Carboxylic residue ○ | | Epoxy compound A | 100 | Photo-acid generator B | — |
| Example 8 | Polyimide B | Amine residue | ○ | Acryl compound A, Acryl compound B | — | Photo-radical polymerization initiator A | — |
| Example 9 | Polyimide B | Amine residue | ○ | Epoxy compound A | 100 | Photo-acid generator A | — |
| Example 10 | Polyimide A | Carboxylic residue ○ | | Epoxy compound A | 100 | Photo-acid generator A | ○ |
| Example 11 | Polyimide A | Carboxylic residue ○ | | Epoxy compound A | 100 | Photo-acid generator A | — |

TABLE 1-continued

| | Material for barrier rib | | | | | | |
|---|---|---|---|---|---|---|---|
| | | Compound (P) | | | Amount of epoxy | | |
| | Raw Materials | End of molecular chain | Phenolic hydroxyl group | Other raw materials | reflecting (*1) | Curing agent | Second layer |
| Comparative Example 1 | Photosensitive acrylic resin | — | — | — | — | Photo-radical polymerization initiator B | — |
| Comparative Example 2 | Phenolic resin A | — | ○ | Epoxy compound A | — | Photo-acid generator A | — |
| Comparative Example 3 | Epoxy resin A | — | — | Epoxy compound A | — | Photo-acid generator A | — |
| Comparative Example 4 | Low-softening-point glass | — | — | — | — | Photo-radical polymerization initiator B | — |

*1: the amount of the epoxy compound with respect to the compound (P) as 100 parts by mass

TABLE 2

| | Amount of structure derived from epoxy compound (*2) | Height L1 of barrier rib | Pitch L2 of barrier rib | Width L3 of bottom of barrier rib | Width L4 of top of barrier rib | L1/L3 | L4/L3 | Arithmetic average slope angle of the side of barrier rib | Reflectance [%] | Brightness [%] | Amount of X-ray absorption [%] | Mechanical strength |
|---|---|---|---|---|---|---|---|---|---|---|---|---|
| Example 1 | 13 | 100 | 127 | 10 | 10 | 10.0 | 1.0 | 2 | 125 | 120 | 115 | A |
| Example 2 | 13 | 100 | 127 | 18 | 18 | 5.6 | 1.0 | 4 | 115 | 110 | 107 | A |
| Example 3 | 13 | 100 | 127 | 15 | 15 | 6.7 | 1.0 | 3 | 120 | 115 | 110 | A |
| Example 4 | 13 | 100 | 127 | 12 | 12 | 8.3 | 1.0 | 3 | 122 | 117 | 112 | A |
| Example 5 | 13 | 100 | 127 | 12 | 12 | 8.3 | 1.0 | 2 | 123 | 118 | 113 | A |
| Example 6 | 13 | 100 | 127 | 11 | 11 | 9.1 | 1.0 | 2 | 124 | 118 | 114 | A |
| Example 7 | 13 | 100 | 127 | 10 | 10 | 10.0 | 1.0 | 2 | 125 | 120 | 115 | A |
| Example 8 | — | 100 | 127 | 20 | 10 | 5.0 | 0.5 | 5 | 110 | 105 | 105 | B |
| Example 9 | 13 | 100 | 127 | 12 | 12 | 8.3 | 1.0 | 5 | 112 | 108 | 110 | A |
| Example 10 | 13 | 100 | 127 | 10 | 10 | 10.0 | 1.0 | — | 140 | 140 | 102 | A |
| Example 11 | 13 | 100 | 127 | 7 | 7 | 14.3 | 1.0 | 2 | 130 | 130 | 120 | A |
| Comparative Example 1 | — | 100 | 127 | 25 | 10 | 4.0 | 0.4 | 10 | 100 | 100 | 100 | C |
| Comparative Example 2 | — | 100 | 127 | 16 | 14 | 6.3 | 0.9 | 7 | 105 | 102 | 102 | B |
| Comparative Example 3 | — | 100 | 127 | 12 | 12 | 8.3 | 1.0 | 4 | 120 | 115 | 110 | C |
| Comparative Example 4 | — | 100 | 127 | 30 | 10 | 3.3 | 0.3 | 20 | 95 | 95 | 90 | A |

*2: the amount of a structure derived from the epoxy compound with respect to the compound (P) as 1 mol In Examples 1 to 11 in which the barrier rib was constituted by a material containing the compound (P), the reflectance and the brightness were high. This is presumably because of the following: the barrier rib was formed of a polyimide that was one of the compounds (P) and had excellent heat resistance, mechanical characteristics, and chemical resistance; hence, less damage was caused by heating and the like in the sputtering step for forming a reflecting layer, and the smoothness of the surface of the barrier rib was not decreased by a solvent and heat in the phosphor packing step; and thus, a first reflecting layer having excellent smoothness was obtained. Furthermore, the sufficient mechanical strength conceivably inhibited the fracture and breakage of the barrier rib during the vacuum printing in the phosphor packing step and the like.

In addition, it is conceivable that, in cases where the barrier rib contained the compound (P) and a structure derived from an epoxy compound, the processability was better, the width of the bottom of the barrier rib was made smaller than the width of the top of the barrier rib, and thus, the amount of the phosphor packed was increased, enhancing the brightness. It is conceivable that, particularly in Examples 1 to 7 and 10 to 11 in which an end of the molecular chain of the compound (P) was a carboxylic residue, the cationic polymerization progressed sufficiently, thus making it possible to form a barrier rib having excellent smoothness, and to further enhance the brightness.

On the other hand, in Comparative Example 1, the barrier rib was formed of an acrylic resin not containing the compound (P), and thus, the arithmetic average slope angle on the side of the barrier rib was worsened, and the smoothness was decreased, thus decreasing the reflectance and the brightness. In addition, the chemical resistance was lower, and thus, the barrier rib in the phosphor packing step was deformed. In Comparative Example 2, the barrier rib was formed of a phenolic resin not containing the compound (P) but containing a phenolic hydroxyl group, and thus, the arithmetic average slope angle on the side of the barrier rib was worsened, and the smoothness was decreased, thus decreasing the reflectance and the brightness. In Comparative Example 3, the barrier rib was formed of an epoxy resin not containing the compound (P), and thus, the reflectance and the brightness were suitable, but the mechanical strength of the barrier rib was low, and the barrier rib was fractured or broken in the step of producing a scintillator panel. In Comparative Example 4, the barrier rib was formed of a low-softening-point glass, and thus, the glass powder melted generated roughness on the side of the barrier rib, decreasing the smoothness of the barrier rib. In addition, the glass melted made the width of the bottom of the barrier rib larger, and accordingly decreased the amount of the phosphor packed, thus decreasing the amount of X-ray absorption. As a result of these, a decrease in the reflectance and the accompanying decrease in the brightness were observed.

DESCRIPTION OF REFERENCE SIGNS

1: Member for radiation detector
2: Scintillator panel
3: Output substrate
4: Substrate
5: Barrier Rib
6: Phosphor layer
7: Barrier membrane layer
8: Photoelectric conversion layer
9: Output layer
10: Substrate
11: First reflecting layer
12: Organic protective layer
13: Second reflecting layer
14: Phosphor
15: Binder resin
L1: Height of barrier rib
L2: Distance between adjacent barrier ribs
L2(X): Distance between adjacent barrier ribs in the X-axis direction
L2(Y): Distance between adjacent barrier ribs in the Y-axis direction
L3: Width of bottom of barrier rib
L4: Width of top of barrier rib

The invention claimed is:

1. A scintillator panel comprising a substrate, a barrier rib formed on the substrate, and a scintillator layer having a phosphor and sectioned by the barrier rib,
wherein the barrier rib contains one or more compounds (P) selected from the group consisting of polyimides, polyamides, polyamideimides, and polybenzoxazoles, and
wherein the amount of the structure derived from an epoxy compound corresponds to 3 mol or more and 25 mol or less when the amount of the compound (P) is 1 mol.

2. The scintillator panel according to claim 1, wherein an end of the molecular chain of the compound (P) is a carboxylic residue.

3. The scintillator panel according to claim 1, wherein the compound (P) has, in the molecular chain, a structure derived from a phenolic hydroxyl group.

4. The scintillator panel according to claim 1, wherein the barrier rib further comprises a structure derived from an epoxy compound.

5. The scintillator panel according to claim 1, comprising a metal-containing reflecting layer on the surface of the barrier rib.

6. The scintillator panel according to claim 5, comprising a protective layer on the surface of the reflecting layer.

7. The scintillator panel according to claim 6, comprising a second reflecting layer on the surface of the protective layer.

8. The scintillator panel according to claim 1, wherein the aspect ratio (L1/L3) of the height L1 of the barrier rib to the bottom width L3 of the barrier rib is 5.0 or more, and wherein the ratio (L4/L3) of the top width L4 of the barrier rib to the bottom width L3 is 0.5 or more.

9. A method of producing a scintillator panel, comprising:
a barrier rib forming step of forming a barrier rib on a substrate to define cells;
a reflecting layer forming step of forming a metal reflecting layer on the surface of the barrier rib; and
a packing step of packing a phosphor in the cells defined by the barrier rib;
wherein the barrier rib contains one or more compounds (P) selected from the group consisting of polyimides, polyamides, polyamideimides, and polybenzoxazoles and a structure derived from an epoxy compound, and
wherein the amount of the structure derived from an epoxy compound corresponds to 3 mol or more and 25 mol or less when the amount of the compound (P) is 1 mol.

* * * * *

UNITED STATES PATENT AND TRADEMARK OFFICE
CERTIFICATE OF CORRECTION

| | |
|---|---|
| PATENT NO. | : 12,055,670 B2 |
| APPLICATION NO. | : 17/912571 |
| DATED | : August 6, 2024 |
| INVENTOR(S) | : Sho Miyao, Natsumi Okura and Kazuyuki Matsumura |

It is certified that error appears in the above-identified patent and that said Letters Patent is hereby corrected as shown below:

On the Title Page

Column 2 under Item (56) U.S. PATENT DOCUMENT, "11,287,638 B2" should be -- 11,287,538 B2 --.

Signed and Sealed this
Twenty-fourth Day of September, 2024

Katherine Kelly Vidal
*Director of the United States Patent and Trademark Office*